(12) United States Patent
Prasad et al.

(10) Patent No.: US 8,897,725 B2
(45) Date of Patent: **\*Nov. 25, 2014**

(54) BEAMFORMING

(71) Applicant: NEC Laboratories America, Inc., Princeton, NJ (US)

(72) Inventors: Narayan Prasad, Monmouth Junction, NJ (US); Kishore Ramachandran, North Brunswick, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/864,355

(22) Filed: Apr. 17, 2013

(65) Prior Publication Data

US 2013/0231059 A1 Sep. 5, 2013

Related U.S. Application Data

(62) Division of application No. 12/941,575, filed on Nov. 8, 2010, now Pat. No. 8,660,598.

(60) Provisional application No. 61/258,861, filed on Nov. 6, 2009, provisional application No. 61/259,844, filed on Nov. 10, 2009.

(51) Int. Cl.
| | |
|---|---|
| *H03C 7/02* | (2006.01) |
| *H04B 1/02* | (2006.01) |
| *H04B 7/02* | (2006.01) |
| *H04B 7/04* | (2006.01) |
| *H04B 7/06* | (2006.01) |
| *H04B 7/08* | (2006.01) |
| *H04B 1/10* | (2006.01) |

(52) U.S. Cl.
CPC ............ *H04B 7/0408* (2013.01); *H04B 7/0695* (2013.01); *H04B 7/088* (2013.01); *H04B 1/1027* (2013.01)
USPC .......................................... 455/101; 455/69

(58) Field of Classification Search
CPC .. H04B 7/0408; H04B 7/0695; H04B 7/0417; H04B 7/0421; H04B 1/1027
USPC .......... 455/46, 47, 67.11, 504, 63.4, 66.1, 69, 455/101
See application file for complete search history.

(56) References Cited

U.S. PATENT DOCUMENTS

| | | | |
|---|---|---|---|
| 2007/0189412 A1* | 8/2007 | Xia et al. ...................... | 375/292 |
| 2008/0153428 A1* | 6/2008 | Han et al. ........................ | 455/69 |

\* cited by examiner

*Primary Examiner* — Ping Hsieh
(74) *Attorney, Agent, or Firm* — Joseph Kolodka; Akitaka Kimura

(57) ABSTRACT

A method implemented in a wireless communications system is disclosed. The method includes: transmitting, from a wireless transmitter having a transmit antenna array, a first signal on each of a plurality of different transmit beams in transmitter (TX) sector level sweep (SLS), receiving, at a wireless receiver having a receive antenna array, the first signal, and determining, at the wireless receiver, quality of the first signal. Other methods, systems, and apparatuses also are disclosed.

11 Claims, 8 Drawing Sheets

BEAMFORMING

RELATED APPLICATION INFORMATION

This application is a divisional of co-pending U.S. patent application Ser. No. 12/941,575, filed on Nov. 8, 2010, which claims priority to provisional application Ser. No. 61/258,861, filed on Nov. 6, 2009, and to provisional application Ser. No. 61/259,844, filed on Nov. 10, 2009, each of which is incorporated herein by reference.

This application is related to commonly assigned application Ser. No. 12/941,546, filed on Nov. 8, 2010 and incorporated herein by reference.

BACKGROUND

1. Technical Field

The present invention relates to wireless communication systems and, in particular, to beamforming methods and systems.

2. Description of the Related Art

For frequencies of about 60 GHz, beamforming techniques present exceptional options for exploiting a unique combination of high free space path loss and the possibility of increased antenna directivity for a given antenna aperture area to improve a link budget. However, channel conditions can vary between beams. To address the problem of changing channel conditions causing a change in the optimal pair of beams employed for communication, prior work has suggested the use of adaptive beamforming techniques. Such techniques require the accurate estimation of the phase and amplitude of signals at the receiver (RX), and subsequent feedback to the transmitter (Tx). These techniques enable the "tracking" of the best pair of beams for communication. However, adaptive beamforming imposes certain hardware requirements on stations, such as requirements for fast and accurate estimation of the phase of the signal at the receiver, which increases their complexity and reduces their applicability.

To address the problem of link blockage, in which data signal transmission is blocked due to poor channel conditions, prior work has suggested using multiple, distributed receiver antennas, for example, via base station diversity or antenna sub-assembly diversity, and multi-hop relays. In the presence of link blockage, it is likely that the beam utilized to transmit data to a current receiver is blocked, but beams to another receiver, for example, either another antenna, node or base station, may still be usable. In such cases, the signals or packets received on the secondary antenna, node or base station will then have to be forwarded to the intended receiver. While such techniques are likely to address the problem, they place additional requirements on the network, such as co-ordination between base stations or between relays, or on the transceivers themselves, such as an additional antenna sub-assembly, which reduces their applicability.

SUMMARY

According to a general aspect, signals can be transmitted on different beams to enable a receiver to determine a respective signal quality for each of the beams. In addition, a plurality of the different beams can be prioritized in accordance with a metric that depends upon the signal quality for each of the plurality of the different beams measured at the receiver and a direction of departure for each of the plurality of the different beams. Further, a particular beam from the plurality of the different beams can be selected and data signals can be transmitted to the receiver on the particular beam.

Other implementations are directed to a beamforming reception method. In accordance with the method, different reception beams can be applied to receive a transmission signal. Additionally, a respective signal quality for each of the reception beams can be determined. A plurality of the different beams can be prioritized in accordance with a metric that depends upon the respective signal quality for each of the plurality of the different beams and a direction of arrival of each of the plurality of the different beams. Moreover, data signals can be received on a particular beam that is selected from the plurality of the different beams.

An alternative implementation is also directed to a beamforming method. Here, a signal quality can be determined for each combination of a transmission beam and a reception beam from candidate sets of transmission and reception beams. Further, the combinations can be prioritized in accordance with a metric that is based upon a signal quality for a given combination measured at a receiver and at least one of: a direction of departure of the transmission beam in the given combination and a direction of arrival of the reception beam in the given combination. A particular combination can be selected in accordance with the priority of the particular combination. In addition, data signals can be transmitted or received on the beams in the particular combination.

Another implementation is directed to beamforming method in which a deterioration of a first communication link between a transmitter and a receiver can be detected. In accordance with the method, in response to the detection, candidate sets of transmission beams and reception beams can be obtained. Here, at least one of the candidate sets is composed of a respective cluster of beams about a transmission beam or a reception beam on which the first communication link is implemented. Moreover, a signal quality for each transmission beam and reception beam pair from the candidate sets can be determined by transmitting or receiving signals on the respective transmission beam or reception beam in each pair. Further, a new communication link can be established with one of the pairs from the candidate sets that is selected based on the determined signal quality for the selected pair.

An alternative implementation is directed to a beamforming method in which a blockage of a first communication link between a transmitter and a receiver can be detected. In response to the detection, candidate sets of transmission beams and reception beams can be obtained, where at least one of the candidate sets is composed of respective beams having azimuthal angles that exceed pre-determined thresholds with regard to a transmission beam or a reception beam on which the communication link is implemented. Additionally, a signal quality for each transmission beam and reception beam pair from the candidate sets can be determined by transmitting or receiving signals on the respective transmission beam or reception beam in each pair. Further, a new communication link can be established with one of the pairs from the candidate sets, which can be selected based on the determined signal quality for the selected pair.

Another implementation is directed to a beamforming system including a transmitter device and a receiver device. In the system, the transmitter device can be configured to separately transmit signals on transmission beams in a candidate set of transmission beams. In addition, the receiver device can be configured to separately apply reception beams from a candidate set of reception beams to receive the signals on the transmission beams and to determine a received signal quality for each transmission beam and reception beam pair from the candidate sets. At least one of the devices can be configured to perform at least one of: a) detection of a deterioration or a blockage of a first communication link between the devices, and b) determination of at least one of the candidate sets by selecting a respective cluster of beams about a transmission beam or a reception beam on which the first communication link is implemented or by selecting beams for inclusion in the respective candidate set that have azimuthal angles exceeding azimuthal angles of beams in the cluster with respect to the transmission beam or the reception beam on which the first communication link is implemented. Moreover, the transmitter and receiver devices can be configured to establish a new communication link on one of the pairs from the candidate sets, which is selected based on the received signal quality for the selected pair.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
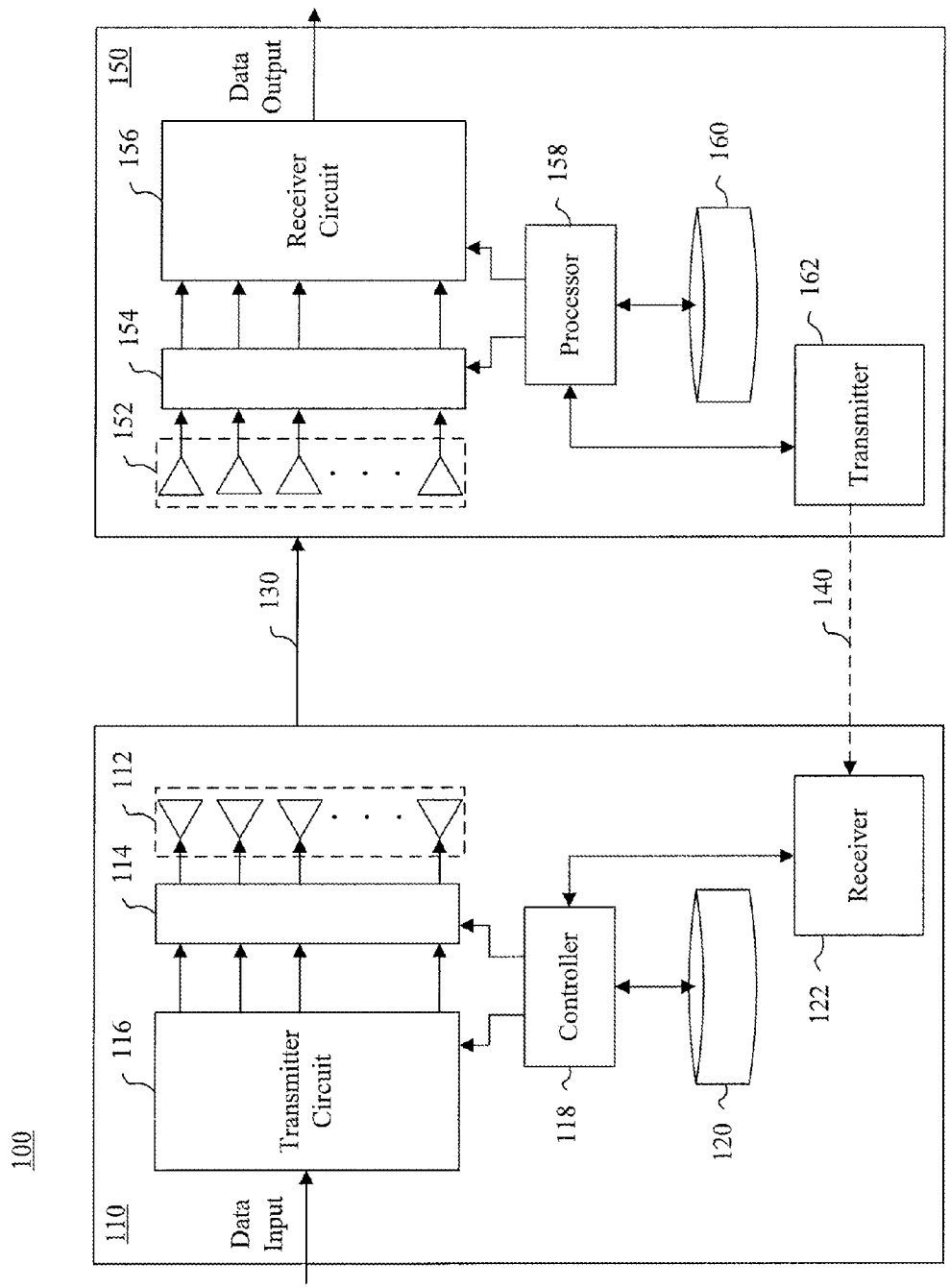
FIG. 1 is block/flow diagram of an embodiment of a beam-forming communication system.

One exemplary embodiment is directed to determining the best pair of transmission and reception beams and, optionally, alternate or backup pairs of beams for wireless communication at 60 GHz between two stations. Specifically, the exemplary embodiments determine or update the best pair of beams or sectors between two stations in the presence of changing channel conditions. Such changing channel conditions can comprise link blockage events, which are especially detrimental for 60 GHz links, or deterioration of channel conditions, which can be due to small, slow channel changes. In addition, as discussed further herein below, exemplary embodiments can employ a combination of a signal-to-noise ratio (SNR) and either direction-of-arrival information (DoA) and/or direction-of-departure (DoD) information to select primary and/or backup (alternate) beams or sectors for communication.

It should be noted that the term "beam," as employed herein, includes the term "sector" and can correspond to a main lobe, as understood by those of ordinary skill in the art. Furthermore, as also understood by those of ordinary skill in the art, one or more beams can be formed by appropriately adjusting the amplitude and/or phase applied to the individual elements of an antenna array. Moreover, it should also be noted that a pair of beams includes a transmission or transmitter beam and a reception beam. Here, a transmission beam is a beam that is transmitted from a transmitter by adjusting the amplitude and/or phase applied to the individual elements of an antenna array while transmitting signals, as discussed above. In turn, a reception beam is formed by appropriately weighting the amplitude and/or phase applied to the individual elements of an antenna array while receiving signals.

Certain methods for selecting the "best" pair of beams for communication between a Tx and an Rx have been based on using an SNR as the only performance metric. Such methods include a Phase 1 stage that incorporates a sector-level-sweep (SLS) during the initial boot-up stage or when the current beam no longer provides a sufficient link-budget for communication. During an SLS, the Tx sequentially tries a large set of beams, for example, 32 or 64, that cover the entire 360 degree azimuthal plane while the Rx uses a quasi-omni beam to receive the set of beams. This sweep can be referred to as a Tx SLS. A subset of Tx beams (or a candidate set) is selected based on the SNRs of each of the Tx beams observed at the Rx during the Tx SLS. Next, the Tx transmits a known signal (pilot) using a quasi-omni beam or any other fixed beam while the Rx sweeps through a large set of reception beams. This sweep can be referred to as a Rx SLS. A subset of reception beams (or a candidate set) is selected based on the SNRs of the pilot signal observed at the Rx for each of the beams applied in the Rx SLS. This combined Tx and Rx sweep process in the Phase 1 stage can be referred to as a "full-SLS." The candidate sets can be determined by the receiver and can be communicated to the transmitter.

Further, the receiver can store the candidate sets as a set of alternate transmission and reception beams that may work well with a given transmitter. This knowledge can be obtained during the Phase-1 stage. Thus, in addition to the best transmission beam and the best reception beam, the receiver store additional transmission and reception beams and can communicate the additional set of transmit beams to the transmitter.

The full-SLS is followed by a Phase 2 stage in which a "beam combination" procedure is used to try each combination of Tx and Rx beams from their respective candidate sets and thereby find the "best" pair of beams, i.e., one transmission beam and one reception beam, to form the communication link. In other words, for each transmission beam, a set of reception beams are applied. The beam combination procedure can be initiated by either the receiver or the transmitter and can be implemented by performing a round-robin trial of the candidate sets of beams carried out between the transmitter and the receiver. Here, the "best" pair of beams is found by measuring the SNR observed at the receiver for each pair or combination attempted during the beam combination stage and selecting the pair with the highest SNR as the pair to be employed in the communication link. The receiver can determine the "best" pair based on the SNRs. In addition to finding the "best" pair of beams, an ordered set of the beams pairs that can serve as "alternate" or "backup" beam pairs can also be remembered for further use when the current link is blocked and is not able to provide certain link performance levels, such as throughput, SNR, etc. The ordering of beam pairs, including the selection of the best beam pair, in accordance with these methods has been purely based on the SNR seen at the Rx when the corresponding pair of beams from the candidate sets is employed.

As described further herein below, exemplary embodiments employ a combination of SNR, and angular information in the form of DoA and/or DoD to select alternate beams at one or both of the Tx and the Rx for communication. Moreover, exemplary methods and systems can be configured to detect varying channel conditions between two 60 GHz wireless communication devices and employ a mechanism to quickly search for and intelligently identify pairs of beams to deal with the different channel conditions. In particular, the identification and trial of selected beams can be tailored to specific types of channel conditions and can enable the timely reaction to such conditions to ensure continued communication between the devices.

Referring now in detail to the figures in which like numerals represent the same or similar elements and initially to FIG. 1, a communication system 100 in accordance with an exemplary implementation is illustrated. The communication system 100 can include a transmitter system 110 and a receiver system 150. The transmitter system 110 can include a transmitter circuit 116 that can receive a data input and can process the input to encode and/or modulate the data in accordance with various known encoding and/or modulating methods. Under the control of the controller 118, the transmitter circuit 116 can transmit the processed data to a weighting module 114, which can modify the amplitude and/or phase of the data signals, as discussed above, received from the transmitter circuit 116 in accordance with commands issued by the controller 118 to generate one or more beams through an antenna array 112 for transmission to the receiver system 150 along a communication link 130. For example, the controller 118 can direct the weighting module 114 to apply array weight vectors (AWVs) to generate the different beams, as understood by those of ordinary skill in the art. The transmitter system 110 can further include a storage medium 120 on which program instructions can be executed by the controller 118 to implement method embodiments described herein. Moreover, the controller 118 can employ the transmitter circuit 116, the weighting module 114 and the antenna array 112 to transmit control information on one or more dedicated channels to the receiver system 150. Such control information can include DoDs of transmission beams and indications of one or more reception beams that the receiver 150 should apply to permit the transmission of data signals to the receiver 150.

The receiver system 150 can include an antenna array 152 that can receive the data signals transmitted by the transmitter system 110 along the communication link 130. The weighting module 154 can adjust the amplitude and/or phase of the individual elements of the antenna array 152 in accordance with commands provided by the processor 158 to generate reception beams, as discussed in detail herein above. For example, the processor 158 of the receiver system 150 can direct the weighting module 154 to apply AWVs to generate any one or more different beams. The adjusted received data signals can be transmitted to the receiver circuit 156, which in turn can process the adjusted data signals to demodulate and/or decode the data signals in accordance with the modulation and/or coding scheme applied by the transmitter circuit 116. Thereafter, the demodulated and/or decoded data can be output. The receiver system can further include a storage medium 160 on which program instructions can be stored for execution by the controller 118 to implement method embodiments described herein.

It should also be noted that the transmitter system 110 can further include a receiver 122 while the receiver system 150 can include a transmitter 162. The receiver 122 can comprise elements 152, 154 and 156 and can be controlled by the controller 118 in the same manner discussed above with regard to the processor 158. Similarly, the transmitter 162 can comprise elements 116, 114 and 112 and can be controlled by the processor 158 in the same manner discussed above with regard to the controller 118. Thus, the transmitter system 110 and the receiver system 150 can act as transceivers and the roles of the transmitter system 110 and the receiver system 150 described in any method embodiments can be reversed. Alternatively, the transmitter 162 and the receiver 122 can be implemented in other ways in accordance with other types of communication systems that can be different from beamforming communication systems. For example, the transmitter 162 and the receiver 122 can be pre-configured to communicate on a pre-determined control channel to exchange control information. For example, such control information can include SNR information and DoA information, as discussed in more detail herein below.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
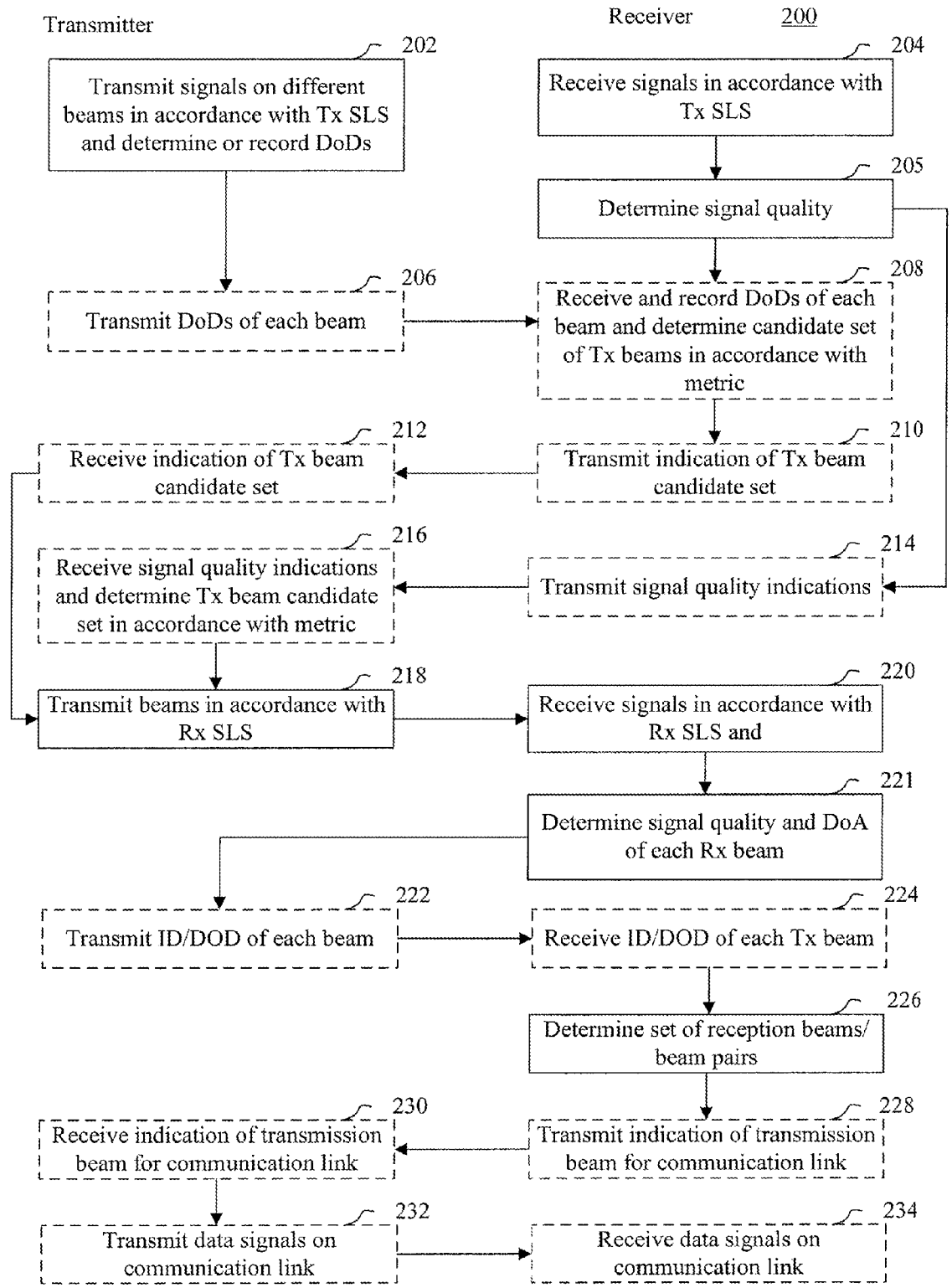
FIG. 2 is a block/flow diagram of an embodiment of a method for implementing sector level sweeps that can include beam combination aspects.

Referring now to FIG. 2 with continuing reference to FIG. 1, a beamforming method 200 in accordance with an exemplary embodiment is illustrated. Method 200 provides one exemplary implementation of a combination of a Phase 1 stage and a beam combination stage. Another exemplary implementation of the method 200 can correspond to only a phase 1 stage, in which transmitter sector-level sweep and receiver sector-level sweeps are performed.

The method 200 can begin at step 202 in which the controller 118 of the transmitter system 110 can direct the weighting module 114 and the antenna array 112 to successively transmit signals on different beams in accordance with Tx SLS and can determine DoDs and record the DoDs in the storage medium 120. For example, as discussed above, the weighting module 114 can adjust the AWVs applied to the input signals, for example pilot signals, to form and scan through beams covering the entire, or a large portion of the azimuthal range. In other words, the controller 118 can direct the weighting module 114 to apply AWVs to generate the different beams, as understood by those of ordinary skill in the art. Further, the controller 118 can infer the DoD from local knowledge of the angular separation between transmit beams. For example, based on the AWVs, the controller 118 can determine the direction of departure of each of the different beams for use in selecting beams on which to transmit data signals to the receiver system 150.

At step 204, the antenna array 152 can receive the signals transmitted at step 202 in accordance with Tx SLS. For example, in accordance with one implementation, the processor 158 of the receiver system 150 can direct the antenna array 152 and the weighting module 154 to generate a fixed reception beam, which can be an omni-directional beam, a quasi-omni directional beam, a directional beam or any other appropriately chosen beam. It should be noted that an omni-direction beam can correspond to a beam covering 360 degrees in all directions, while a quasi-omni beam can correspond to a volume with borders differing in azimuthal angle of for example, 120 degrees, from each other. As indicated above, reception beams can be generated by modifying the AWVs applied to the received signals. Similar to the transmitter system 110, the processor 158 of the receiver system 150 can direct the weighting module 154 to apply AWVs to generate any one or more different beams.

At step 205, the processor 158 can determine a signal quality for each of the received transmission beams. For example, the signal quality can be an SNR, a bit error rate (BER), a packet error rate (PER) or a frame error rate (FER), or any combination of these rates.

Optionally, at step 206, the controller 118 can direct the transmitter circuit 116, the weighting module 114 and the antenna array 112 to transmit the DoDs of each beam. For example, step 206 can be performed if the candidate set of transmission beams are determined at the receiver system 150. It should be noted that step 206 can be incorporated into step 202, wherein the controller 118 can include DOD information in the packet header when transmission beams are transmitted during the Tx SLS.

Optionally, at step 208, the antenna array 152 can receive DoDs of each of the transmission beams and the processor 158 can compute a metric and determine a candidate set of transmission beams by selecting transmission beams based on the metric. The processor can further record the DoDs of each of the transmission beams in the storage medium 160. Here, the metric can be dependent upon the signal quality of a particular transmission beam and the DoD of the particular transmission beam. For example, the processor 158 can maintain a first list of transmission beams that is prioritized in accordance with the signal quality measured at the receiver, with the transmission beam with the highest quality at the top of the list (having top priority) and the transmission beam with the lowest quality at the bottom of the list. In addition, the processor 158 can maintain a second list that is prioritized based on both the signal qualities and the DoDs of the transmission beams.

For example, in the case of the second list, one sample ordering or prioritization is as follows. First, the processor 158 can select a subset of the first list as a starting point such that only those transmission beams with a signal quality that is greater than a signal quality threshold are included in the subset. Alternatively, the processor 158 can select the top N transmission beams having the largest signal qualities for inclusion in this subset. It should be noted that the choice of N can also be flexible and could be made at either station and conveyed to the other. Second, in this reduced set or subset, the processor 158 can determine the order such that the first entry corresponds to the transmission beam with the highest signal quality, the second entry corresponds to the transmission beam that has the largest angular separation in DoD from the transmission beam in the first entry, the third entry corresponds to the transmission beam with the second largest angular separation in DoD from the first entry, and so on.

This ordering can be captured by the following: metric1 (reference Tx beam, Tx beam), where, for a reference transmission beam (the first entry in the subset) and another transmission beam in the subset, the metric is high when the angular separation between the transmission beams in the pair is high, and the metric is low when the angular separation between the transmission beams is low. It should be noted that another implementation of the second list can be ordered similarly using a second metric that works in the opposite manner. Namely, metric2 (reference Tx beam, Tx beam) is high when angular separation between the transmission beams is low and the second metric is low when the angular separation between the beams is high. Accordingly, using the same subset from the first list described above, the order of the second list in accordance with the second metric is determined such that the first entry corresponds to the transmission beam with the highest signal quality, the second entry corresponds to the transmission beam that has the smallest angular separation in DoD from the transmission beam in the first entry, the third entry corresponds to the transmission beam with the second smallest angular separation in DoD from the first entry, and so on.

As discussed further herein below, the listing in accordance with metric1 can be utilized to arrive at a list of transmission beams that can be used when addressing link blockage, while the listing in accordance with metric2 can be used when addressing small, slow channel changes in channel conditions. It should be noted that the second listing, ordered in accordance with either metric1 or metric2, can also be referred to as a "candidate set." Furthermore, it should also be understood that both of the second listings can be determined and stored by one or both of the transmitter system 110 and the receiver system 150.

Optionally, at step 210, the processor 158 can direct the transmitter 162 to transmit an indication of the transmission beams in the ordered candidate set(s) to the transmitter system 110. For example, the processor 158 can direct the transmission of identifiers for the transmission beams in the prioritized, candidate set(s), in the corresponding determined order, to the transmitter system 110. As noted above, the candidate sets can include both of the second listings determined in accordance with metric1 and metric2.

Optionally, at step 212, the antenna array 112 can receive the indications of the transmission beams in the candidate set(s) and can store the indication in the storage medium 120 for use in the subsequent receiver SLS or in a beam combination stage, as discussed in more detail herein below.

Alternatively, as opposed to determining the candidate set(s) of transmission beams at the receiver system 150, the candidate set(s) of transmission beams can be determined at the transmitter system 110. Thus, optionally, at step 214, the processor 158 can direct the transmitter 162 to transmit indications of the signal qualities measured at step 205.

At step 216, the receiver 122 can receive the signal quality indications and the controller 118 can determine a metric and can determine the candidate set(s) of transmission beams by selecting transmission beams based on the metric. The determination of one or both of the candidate sets can be performed in the same manner described above with respect to step 208.

It should be understood that in accordance with exemplary embodiments, where the receiver system 150 includes transmission components 116, 114 and 112 as the transmitter 162 and where the transmitter system 110 includes reception components 156, 154 and 152 as the receiver 122, the transmission SLS can be performed in reverse. For example, here, the receiver system 150 can perform steps 202, 206, 212 and/or 216 while the transmitter system 110 can perform steps 204, 205, 208, 210 and/or 214. Accordingly, candidate sets can be determined for the situation in which the receiver system 150 acts as a transmitter and the transmitter system 110 acts as a receiver. The candidate sets here can be employed to determine a communication link for the transmission of control information from the system 150 to the system 110. In addition, it should also be noted that step 214 can be omitted from the procedure described above and can be incorporated in step 202 here when performed by the system 150. For example, in each transmitted packet for a respective transmission beam transmitted at step 202 by the receiver system 150, the system 150 can feed back a signal quality report to the system 110 corresponding to each transmission beam on which a packet was received during the performance of step 204 by the system 150.

At step 218, the controller 118 of the transmitter system 110 can direct the weighting module 114 and the antenna array 112 to transmit signals in accordance with a receiver sector level sweep and can determine or record DoDs in the storage medium 120. For example, the controller 118 of the transmitter system 110 can direct the weighting module 114 and the antenna array 112 beam to transmit a fixed beam, such as an omni-directional beam, a quasi-omni directional beam, a directional beam or any other appropriately chosen beam. In accordance with one exemplary implementation, the transmitter system 110 can transmit a set of transmission beams chosen based on signal quality alone or on a set of transmission beams chosen based on signal quality and DoD. For example, the set of transmission beams can correspond to the transmission beams compiled in the first list described above with respect to step 208. Alternatively, the transmission beams can correspond to the second listing described above with respect to step 208, ordered in accordance with metric1 or metric2.

At step 220, the antenna array 152 can receive the signals transmitted at step 218 in accordance with Rx SLS. For example, in accordance with one implementation, the processor 158 of the receiver system 150 can direct the antenna array 152 and the weighting module 154 to form, scan through and apply different reception beams covering the entire, or a large portion of, the azimuthal range. As indicated above, reception beams can be generated by modifying the amplitude and/or phase of received signals using AWVs. Here, for each of the reception beams, the receiver 150 can receive one or more packets from the Tx. In particular, the receiver system 150 can sweep through its full set of reception beams once for each transmission beam transmitted at step 218.

At step 221, the processor 158 can determine and record a signal quality for each of the received transmission beams and the DoA of each Rx beam. For example, as noted above, the signal quality can be dependent on an SNR, a BER, a PER or an FER, or any combination of the rates. In addition, the processor 158 can infer the DoA of each of the reception beams based on local knowledge of the angular separation between reception beams. For example, the processor 158 can determine the DoA of each of the reception beams using the AWVs applied to generate the reception beam.

Optionally, at step 222, the controller 118 can direct the transmitter circuit 116, the weighting module 114 and the antenna array 112 to transmit an identifier of each transmission beam in the set of beams transmitted at step 218. Here, the identifier (ID) of the beam can be an indication of the DoD of the beam, where the receiver system 150 can reference a lookup table to find the DoD of the beam if employed to prioritize combinations of beams, as discussed in more detail herein below. Alternatively, the controller 118 can transmit both an identifier and a DoD of each transmission beam in the set of beams transmitted at step 218.

Optionally, at step 224, the antenna array 152 and the processor 158 can receive the ID/DoD for each Tx beam transmitted at step 218.

At step 226, the processor 158 can determine one or more candidate sets of M reception beams in accordance with a metric. Here, the metric can be dependent upon the signal quality of a particular reception beam observed at the receiver 150 and the DoA of the particular reception beam. For example, as discussed above with regard to the formulation of the candidate sets of transmission beams, the processor 158 can maintain a first list of reception beams that is prioritized in accordance with the signal quality measured at the receiver, with the reception beam with the highest quality at the top of the list. In addition, the processor 158 can maintain a second list that is prioritized based on both the signal qualities and the DoAs of the reception beams.

For example, in the case of the second list, one sample ordering or prioritization is as follows. First, the processor 158 can select a subset of the first list such that only those reception beams with a signal quality that is greater than a signal quality threshold are included in the subset. Alternatively, the processor 158 can select the top M reception beams having the largest signal qualities for inclusion in this subset. It should be noted that the choice of M can also be flexible and could be made at either station and conveyed to the other. Second, in this reduced set or subset, the processor 158 can determine the order such that the first entry corresponds to the reception beam with the highest signal quality, the second entry corresponds to the transmission beam that has the largest angular separation in DoA from the reception beam in the first entry, the third entry corresponds to the transmission beam with the second largest angular separation in DoA from the first entry, and so on.

This ordering can be captured by the following: metric3 (reference RX beam, RX beam), where, for a reference reception beam (the first entry in the subset) and another reception beam in the subset, the metric is high when the angular separation between the reception beams is high, and the metric is low when the angular separation between the reception beams is low. It should be noted that another implementation of the second list can be ordered similarly using a fourth metric that works in the opposite manner. Namely, metric4 (reference RX Sector, RX sector) is high when angular separation between the reception beams is low and the fourth metric is low when the angular separation between the beams is high. Accordingly, using the same subset from the first list described above, the order of the second list in accordance with the fourth metric is determined such that the first entry corresponds to the reception beam with the highest signal quality, the second entry corresponds to the reception beam that has the smallest angular separation in DoA from the reception beam in the first entry, the third entry corresponds to the transmission beam with the second smallest angular separation in DoA from the first entry, and so on.

As discussed further herein below, the listing in accordance with metric3 can be utilized to arrive at a list of reception beams that can be used when addressing link blockage, while the listing in accordance with metric4 can be used when addressing small, slow channel changes in channel conditions. It should be noted that the second listing, ordered in accordance with either metric3 or metric4, can also be referred to as a "candidate set" for reception beams. Furthermore, it should also be understood that both of the second listings in accordance with metric3 or metric4 can be determined and stored by one or both of the transmitter system 110 and the receiver system 150.

It should also be noted that, in accordance with exemplary aspects, a beam combination stage need not be performed to find the optimal transmission and reception beam pair to use for data communication. For example, if the transmitter system 110 transmits the ID/DoD of each beam transmitted at step 218, then the processor 158 of the receiver system 150 can note the DoD of each signal quality measurement at step 221. Accordingly, the optimal pair would correspond to the reception beam and transmission beam pair resulting in the largest signal quality.

Thus, optionally, at step 228, the processor 158 can direct the transmitter 162 to transmit an indication of the transmission beam in the optimal pair to the transmitter system 110. The indication can be an identifier for the transmission beam or the DoD of the transmission beam.

Optionally, at step 230, the receiver 122 of the transmitter system 110 can receive the indication of the transmission beam in the optimal pair for use in establishing a communication link for the transmission of data.

Accordingly, at optional steps 232 and 234, the controller 118 and the processor 158 can establish a communication link and can direct the transmission or the receipt of data signals on the transmission beam and the reception beam in the optimal pair, respectively.

Figure 5:
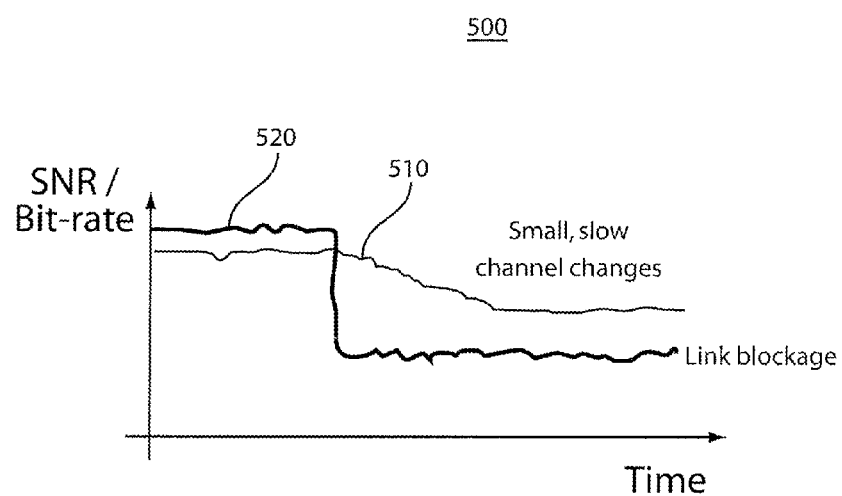
FIG. 5 is a graph illustrating link blockage and link deterioration events.

It should further be noted that the transmitter system 110 and the receiver system 150 can maintain the lists ordered in accordance with any one or more of metric1, metric2, metric3 or metric4 for use in a subsequent reduced transmission or reception SLS stages or in a subsequent beam combination (BC) stage, as discussed in more detail herein below with respect to FIG. 5. In addition, the processor 158, and/or the controller 118, can maintain a beam combination list that can be based on a hybrid of metric1/metric3 or metric2/metric4. For example, if signal qualities are recorded for each combination of reception beams and transmission beams trialed at steps 218 and 220, then the processor 158 and/or the controller 118 can order the combinations based on both the DoD of the transmission beam and the DoA of the reception beam.

For example, at step 226, the processor 158 (and/or the controller 118 in other implementations), can maintain a first list of transmission beams and reception beams that is prioritized in accordance with the signal quality measured at the receiver, with the beam pair with the highest quality at the top of the list. In addition, the processor 158 can maintain a second list that is prioritized based on the signal qualities, the DoAs of the reception beams and the DoDs of the transmission beams.

For example, one sample ordering or prioritization of the second list as follows. First, the processor 158/controller 118 can select a subset of the first list such that only those transmission and reception beam pairs with a signal quality that is greater than a signal quality threshold are included in the subset. Alternatively, the processor 158/controller 118 can select the top P transmission and reception beam pairs having the largest signal qualities for inclusion in this subset. It should be noted that the choice of P can be flexible and could be made at either station and conveyed to the other. Second, in this reduced set or subset, the processor 158/controller 118 can determine the order such that the first entry denotes the optimal pair and corresponds to the transmission beam/reception beam pair with the highest signal quality. Here, the second entry can correspond to the pair that has the largest angular disparity with respect to the optimal pair. For example, the angular disparity can be determined by averaging a) the difference between the direction of arrival of the reception beam in a particular pair with the direction of arrival of the reception beam in the optimal pair, and b) the difference between the direction of departure of the transmission beam in the particular pair with the direction of departure of a transmission beam in the optimal pair. Thus, the beam pair having the largest average can correspond to the beam pair having the largest angular disparity with respect to the optimal pair. Similarly, the beam pair having the smallest average can correspond to the beam pair having the smallest angular disparity with respect to the optimal pair. The third entry can correspond to the transmission beam and reception beam pair with the second largest angular disparity from the first entry, and so on.

This ordering can be captured by the following: metric5 (reference beam combination, beam combination), where, for a reference beam combination (the first entry in the subset) and another beam combination in the subset, the metric is high when the angular disparity between the beam combinations in the pair is high, and the metric is low when the angular disparity between the beam combinations is low. It should be noted that another implementation of the second list can be ordered similarly using a sixth metric that works in the opposite manner. Namely, metric6 (reference beam combination, beam combination) is high when angular disparity between the combinations is low and the sixth metric is low when the angular separation between the combinations is high. Accordingly, using the same subset from the first list described above, the order of the second list in accordance with the sixth metric is determined such that the first entry corresponds to the optimal beam pair with the highest signal quality, the second entry corresponds to the beam pair that has the smallest angular disparity with respect to the beam pair in the first entry, the third entry corresponds to the beam pair with the second smallest angular disparity from the first entry, and so on.

As discussed further herein below, the listing in accordance with metric5 can be utilized to arrive at a list of transmission beams that can be used when addressing link blockage, while the listing in accordance with metric6 can be used when addressing small, slow channel changes in channel conditions. Furthermore, it should also be understood that both of the second listings in accordance with metric5 or metric6 can be determined and stored by one or both of the transmitter system 110 and the receiver system 150.

It should be understood that in accordance with exemplary embodiments, where the receiver system 150 includes transmission components 116, 114 and 112 as the transmitter 162 and where the transmitter system 110 includes reception components 156, 154 and 152 as the receiver 122, the reception SLS can be performed in reverse. For example, here, the receiver system 150 can perform steps 218, 222, 230 and/or 232 while the transmitter system 110 can perform steps 220, 221, 224, 226, 228 and/or 234. Accordingly, candidate sets can be determined for the situation in which the receiver system 150 acts as a transmitter and the transmitter system 110 acts as a receiver. Similar to the transmission SLS discussed above, the candidate sets here can be employed to determine a communication link for the transmission of control information from the system 150 to the system 110.

Although the method 200 has been described with respect to employing a set of different transmission beams for the receiver SLS, in accordance with other exemplary embodiments, the receiver SLS can be performed using an omni or quasi omni transmission beam. For example, steps 202-216 of the method 200 can be performed as described above. However, at step 218, as opposed to transmitting beams determined and compiled at steps 208 and/or 216 using a signal quality, the controller 118 can direct the transmitter system to transmit an omni or quasi-omni beam. Thereafter, at step 220 the processor 158 can sweep through all of the reception beams and, at step 221, can determine a signal quality and a corresponding direction of arrival for each of the reception beams in accordance with a beamformer method, Capon method, a linear estimation method, a minimum norm method, Multiple Signal Classification (MUSIC), or Estimation of Signal Parameters via Rotational Invariance Techniques (ESPRIT). Thereafter, the method 200 can proceed to step 226 in which the candidate set of reception beams can be determined as discussed above with respect to step 226. For example, the processor 158 can compile a listing of reception beams having a signal quality exceeding a signal quality threshold, or a set of M reception beams having the largest signal qualities. In addition, from the first listing, the processor 158 can compile a second listing to obtain one or more candidate sets in accordance with metric3 and metric4, as discussed above. Subsequently, at step 228 and 230, as opposed to transmitting and receiving an indication of a transmission beam for a communication link, the processor 158 and the controller 118 can respectively transmit and receive a total number of reception beams in the candidate set of reception beams. Thereafter, the receiver 150 and transmitter 110 systems can undergo a beam combination stage, discussed in more detail herein below with respect to FIG. 3, to obtain an optimal pair of transmission and reception beams on which to transmit and receive data signals. The total number of reception beams in the candidate set permits the controller 118 of the transmitter system 110 to determine the number of times or the duration for which it should transmit each of the transmission beams in the candidate set during a beam combination stage.

Figure 3:
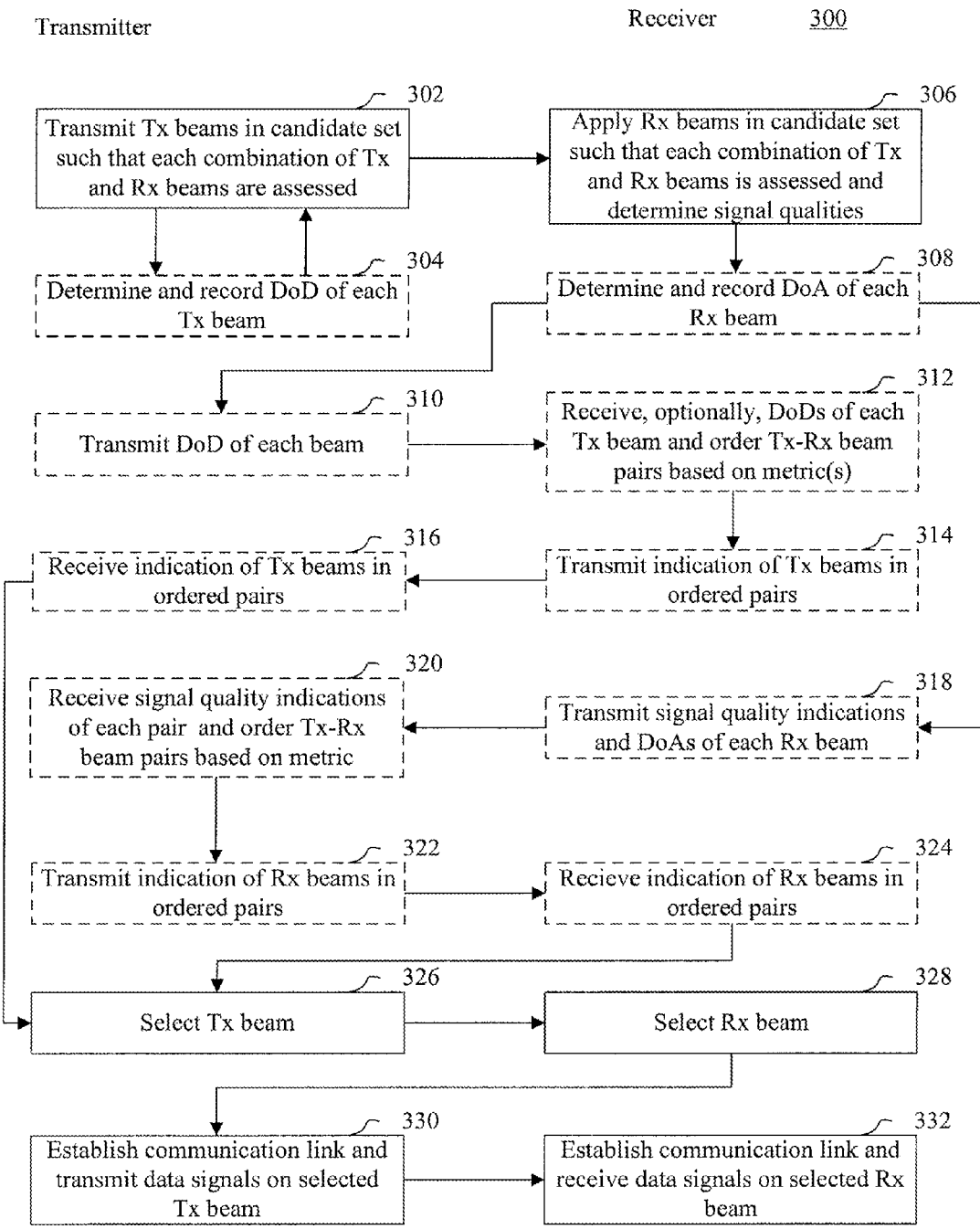
FIG. 3 is a block/flow diagram of an embodiment of a method for implementing a beam combination procedure.

With reference now to FIG. 3, with continuing reference to FIGS. 1 and 2, a beamforming method 300 in accordance with one exemplary embodiment is illustrated. The method 300 provides one exemplary implementation of a beam combination stage in which a transmission and a reception beam can be selected to establish a communication link for the transmission of data signals. In addition, alternative or back up pairs of transmission and reception beams can be determined and employed in the event of a deterioration or blockage of a communication link. The beam combination stage can be initialized after step 226 or step 230 of method 200.

Figure 4:
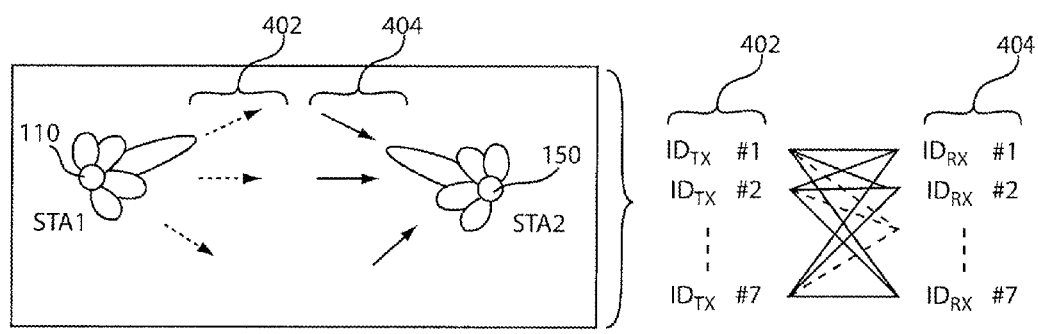
FIG. 4 is a diagram illustrating a beam combination procedure.

The method 300 can begin at step 302, in which the controller 118 can direct the weighting module 114 and the antenna array 112 to transmit the transmission beams in the transmission beam candidate set such that each combination of transmission beams and reception beams in the candidate sets are assessed. Similarly, at step 306 the processor 158 can direct the weighting module 154 and the antenna array 152 to apply the reception beams in the reception beam candidate set such that each combination of transmission beams and reception beams in the candidate sets are assessed. For example, each pair out of the N×M beam pairs (formed by one beam each from the respective candidate sets) can be transmitted or applied. FIG. 4 provides a diagram illustrating a beam combination stage where each of the transmission beams 402 $ID_{Tx}$ 1-$ID_{Tx}$ 7 are assessed with each of the reception beams 404 $ID_{Rx}$ 1-$ID_{Rx}$ 7 in the candidate sets. Further, the processor 158 can determine a signal quality for each transmission beam and reception beam combination assessed.

Optionally, at step 304, the controller 118 can determine and record the DoD of each transmitter beam transmitted at step 302. For example, the DoDs can be determined or recorded in the same manner discussed above with regard to step 202. Thereafter, at optional step 310, the controller 118 can direct the transmitter circuit 116, the weighting module 114 and the antenna array 112 to transmit an indication of the DoDs of the beams transmitted at step 302. Alternatively, steps 304 and 310 can be omitted if the DoDs for the transmitter beams in the candidate set were recorded at steps 202 and 208.

Optionally, at step 308, the processor 158 can determine and record the DoA of each reception beam applied at step 306. For example, the DoAs can be determined and recorded in the same manner discussed above with regard to step 220. Alternatively, step 308 can be omitted if the DoAs for the transmitter beams in the candidate set were recorded at step 220.

Optionally, at step 312, the antenna array 154 can receive the DoDs of each of the transmitter beams (if not recorded during the execution of method 200) and the processor 158 can prioritize the transmission and reception beam pairs in accordance with a metric. For example, using the signal qualities measured at step 306, the processor 158 can order the pairs in accordance with metric5 and/or metric6 as discussed above with respect to step 226. As discussed above, the "best" beam pair that is ordered at the top of the listing can correspond to the beam pair with the best signal quality. Subsequent beam pairs in the listing can be prioritized in accordance with metric5 and/or metric6, as described above.

Optionally, at step 314 the processor 158 can direct the transmitter 162 to transmit an indication of the transmission beams in the ordered pairs, which in turn can be received by the receiver 122 of the transmission system 110 at optional step 316. For example, the processor 158 can transmit identifiers of transmission beams in an order corresponding to the order of the beam pairs determined at step 312. Further, if both metric5 and metric6 are employed, then an identifier can be transmitted to indicate the start of a new listing. Alternatively, the processor 158 can identify a subset of the N Tx beams which are present in the top Q pairs of each listing, with Q being a design parameter, in the ordered list(s) and can feed their identifiers back to the transmitter 110 at step 314. The transmitter 110 can then use the identified beams as its new candidate set. The Rx can also accordingly update its candidate set at step 312 with the reception beams in the order of the ordered list of Q beam pairs. The values of N and M can be updated to the sizes of the respective new transmission and reception beam candidate sets.

In an alternative implementation, the transmitter 110 can determine the ordered listing of transmission and reception beam pairs. Thus, optionally, at step 318, the processor 158 of the receiver system 150 can direct the transmitter 162 to transmit indications of the signal quality observed for each beam pair assessed at step 306 and can transmit the DoAs of each reception beam assessed to the transmitter system 150.

At step 320, the antenna array 112 can receive the signal quality indications of each pair and the controller 118 can prioritize the transmission and reception beam pairs. Here, the controller 112 can order the pairs in the same manner described above with respect to step 312.

Similarly, at step 322 the controller 118 can direct the transmitter circuit 116, the weighting module 114 and the antenna array 112 to transmit an indication of the receiver beams in the ordered pairs for receipt by the receiver system 150 at optional step 324. For example, the controller 118 can transmit identifiers of reception beams in an order corresponding to the order of the beam pairs determined at step 320 for each of the listings compiled in accordance with metric5 and/or metric6. Alternatively, the controller 118 can identify reception beams corresponding to a subset of Q pairs and the transmitter system 110 and the receiver system 150 can update their candidate sets accordingly, as discussed above with respect to step 314.

Thereafter, at step 326, the controller 118 can select the transmission beam based on the listing. For example, the controller 118 can select the transmission beam included in the optimal beam pair in the ordered list(s) of beam pairs having the highest signal quality.

In turn, at step 328, the processor 158 can select the reception beam based on the metric. For example, the processor 158 can select the reception beam included in the optimal beam pair in the ordered list(s) of beam pairs.

At steps 330 and 332, the controller 118 and the processor 158 can establish a communication link and can direct the transmission and the receipt of data signals on the transmission beam and the reception beam selected at steps 326 and 328, respectively.

It should be noted that in the situation in which the system 110 acts as a receiver and the system 150 acts as a transmitter, the beam combination stage can be performed in the same manner discussed above, except that the roles of the systems 110 and 150 are reversed.

It should also be understood that the prioritized listing ordered in accordance with metrics 1-6 can be employed in situations in which the established communication link is deteriorated or is blocked. Here, a link deterioration event can correspond to an event in which small, slow changes in channel conditions occur on a currently utilized Tx-Rx beam pair. In turn, a link blockage event can correspond to an event that leads to a reduced link capacity on a currently utilized Tx-Rx beam pair which permits only control information to be communicated between the Tx and the Rx and does not permit data communication. The control information here can be transmitted at a reduced rate and can be communicated using a more robust modulation and coding scheme than that employed for the communication of data signals. A link blockage event can further include an event in which a reduced link capacity on a currently utilized Tx-Rx beam pair that does not permit either communication of control or data information.

In addition, a link blockage event or a link deterioration event can be detected in several ways. For example, either event can be detected based on a rate of drop in SNR at the receiver system 150 or at a rate of increase in packet loss at the transmitter system 110 or the receiver system 150. The rates can be compared with a corresponding threshold to determine whether a corresponding drop or increase warrants a determination of link blockage or link deterioration. The transmitter system 110 or the receiver system 150 can indicate to the receiver system 150 or the transmitter system 110 that an SLS should be carried out using only the N Tx beams and M Rx beams that form the respective candidate sets found during a "full-SLS" process, for example in accordance with the method 200 described above or a "full-SLS plus beam combination" process, for example in accordance with both methods 200 and 300 described above. The SLS in which only the N Tx beams and M Rx beams that form the respective candidate sets is referred to herein as a "reduced SLS." Accordingly, a reduced SLS can be performed in the same manner discussed above with regard to method 200 except that the Tx SLS and the Rx SLS scan through only the N Tx beams and M Rx beams that form the respective candidate sets to determine new candidate sets ordered in accordance with the respective metrics described above with regard to steps 208 and 226. After the "reduced-SLS" new Tx and Rx candidate sets, which can be subsets of the N Tx beams and M Rx beams, respectively, are found, a BC stage (Phase 2) can optionally be performed in accordance with method 300 where each beam pair formed by a Tx and Rx beam from the new candidate sets is assessed.

Alternatively, a partial reduced-SLS can be carried out for only one station followed by a BC stage, where that station uses its candidate set updated with the partial reduced-SLS and the other one uses its previous candidate set. For example, steps 202-216 can be carried out by using only the N transmission beams from the candidate set determined previously in accordance with the method 200 to compute a new, updated candidate set of transmission beams. Thereafter, the method 300 can be performed with the new, updated candidate set of transmission beams and with the candidate set of reception beams determined previously in accordance with the method 200. Alternatively, 218-230 can be carried out by using only the M reception beams from the candidate set determined previously in accordance with the method 200 to compute a new, updated candidate set for the reception beams. Subsequently, the method 300 can be performed with the new, updated candidate set of reception beams and with the candidate set of transmission beams determined previously in accordance with the method 200.

In accordance with another exemplary embodiment, in response to detecting a link blockage or a link deterioration event, the transmitter system 110 or the receiver system 150 can indicate to the receiver system 150 or the transmitter system 110, respectfully, that a beam combination (BC) stage (Phase 2), for example in accordance with the method 300, should be directly carried out using the most recently updated Tx and Rx candidate beam sets, with N and M denoting their respective sizes. The resulting process is referred to herein as the direct BC stage. As indicated above with regard to the BC stage, a round-robin trial of the N×M beam pairs can be tried out between the Tx and the Rx. For each of the N Tx beams, M Rx beams are used, and once all Tx beams are trialed, the ordered set of beam pairs for communication can then be determined based on one or more metrics, as described above with regard to step 312. The "best" beam pair identified during this procedure can then be used for further communication of data.

In accordance with a different embodiment, in response to detecting a link blockage or deterioration event, the transmitter system 110 or the receiver system 150 can indicate to the receiver system 150 or the transmitter system 110, respectfully, that a "new" beam pair from the existing set of ordered beam pairs determined from an earlier BC stage in accordance with the method 300 described above with respect to FIG. 3, or from an earlier implementation of step 226 of method 200, can be selected by the transmitter system 110 and the receiver system 150 for further communication on the beam pair. For example, at steps 326 and 328, the controller 118 and the processor 158 can select the next beam pair (that was not previously selected) in a corresponding listing as the beam pair on which the communication link can be established at steps 330 and 332 of method 300, or at steps 232 and 234 of method 200. As mentioned above, for a link blockage event, the listing formed in accordance with metric5 can be employed to select the next pair of beams on which to establish a communication link. In turn, for a link deterioration event, the listing formed in accordance with metric6 can be employed to select the next pair of beams on which to establish a communication link.

Alternatively, the next beam pair in the ordered list of beam combinations can be employed as an initial choice for further beam refinement, such as refinement discussed herein below with respect to method 600. Thus, at steps 326 and 328, the controller 118 and the processor 158 can select the refined beam pair as the beam pair on which the communication link can be established at steps 330 and 332. Other ways to select the new beam pair based on the ordered listing are also possible.

By using the prioritized lists ordered in accordance with any one or more of the metrics 1-6, determination of a transmission and reception beam pair on which to establish a communication link can be searched for and identified in a manner that is specifically tailored to the type of channel conditions that affect the quality of a communication link. In particular, the procedure for finding the transmission and reception beam pair can be tailored to link blockage or deterioration events, respectively, to permit quick and efficient adaptation to varying channel conditions and thereby improve the quality and throughput of communication links employed to transmit data.

For example, in accordance with exemplary aspects, a BC stage procedure and/or reduced Tx/Rx SLS procedures can be utilized to address changing channel conditions between the transmitter system 110 and the receiver system 150 that may cause a current beam pair to deliver sub-optimal performance. Here, the BC stage and/or reduced Tx/Rx SLS procedures can be employed to identify alternate beam pairs that may provide better performance than the ones being used. Specifically, different sets of beams can be employed for different channel change events. As indicated above, two likely channel change events include link deterioration events, in which small, slow changes in channel conditions occur, and link blockage events. FIG. 5 provides a graph 500 of SNR/Bit-rate v. time in which a plot 510 illustrating a link deterioration event is compared to a plot 520 illustrating a link blockage event. Either event can be detected in various ways at the transmitter or the receiver based upon, for example, a rate of drop in SNR at the receiver or rate of increase in packet loss at the transmitter. In the case of a link deterioration event, the best beam pair is likely to lie around or near the current beam pair being used. Hence, a list of transmit and receive beams clustered around the current transmit and receive beam can be determined and employed for evaluation in accordance with a BC stage and/or a reduced Tx/Rx SLS procedure. Alternatively, in the case of link blockage events, beams that are separated from each other in the azimuthal angle are more likely to be unblocked, and hence useful. According to one exemplary feature, once the reduced Tx/Rx SLS procedure and/or the BC stage is carried out, the receiver system 150 can then communicate the transmission beams to the transmitter system from a new, ordered set of beam pairs. The new ordered set can be determined in accordance with method 200 and/or 300 or can be determined solely based on the signal qualities observed during the BC stage for the various beam combinations. The new, ordered set can also be stored in the respective storage mediums by the transmitter system 110 and the receiver system 150 to be employed in the next link blockage or link deterioration event. For example, if a new link blockage or link deterioration is detected, each pair in the new, ordered list determined from a previous link blockage or link deterioration event, respectively, can be successively trialed in order until a pair providing a sufficient link quality is found. That pair can then be employed for the transmission of data from the transmitter system 110 to the receiver system 150.

Figure 6:
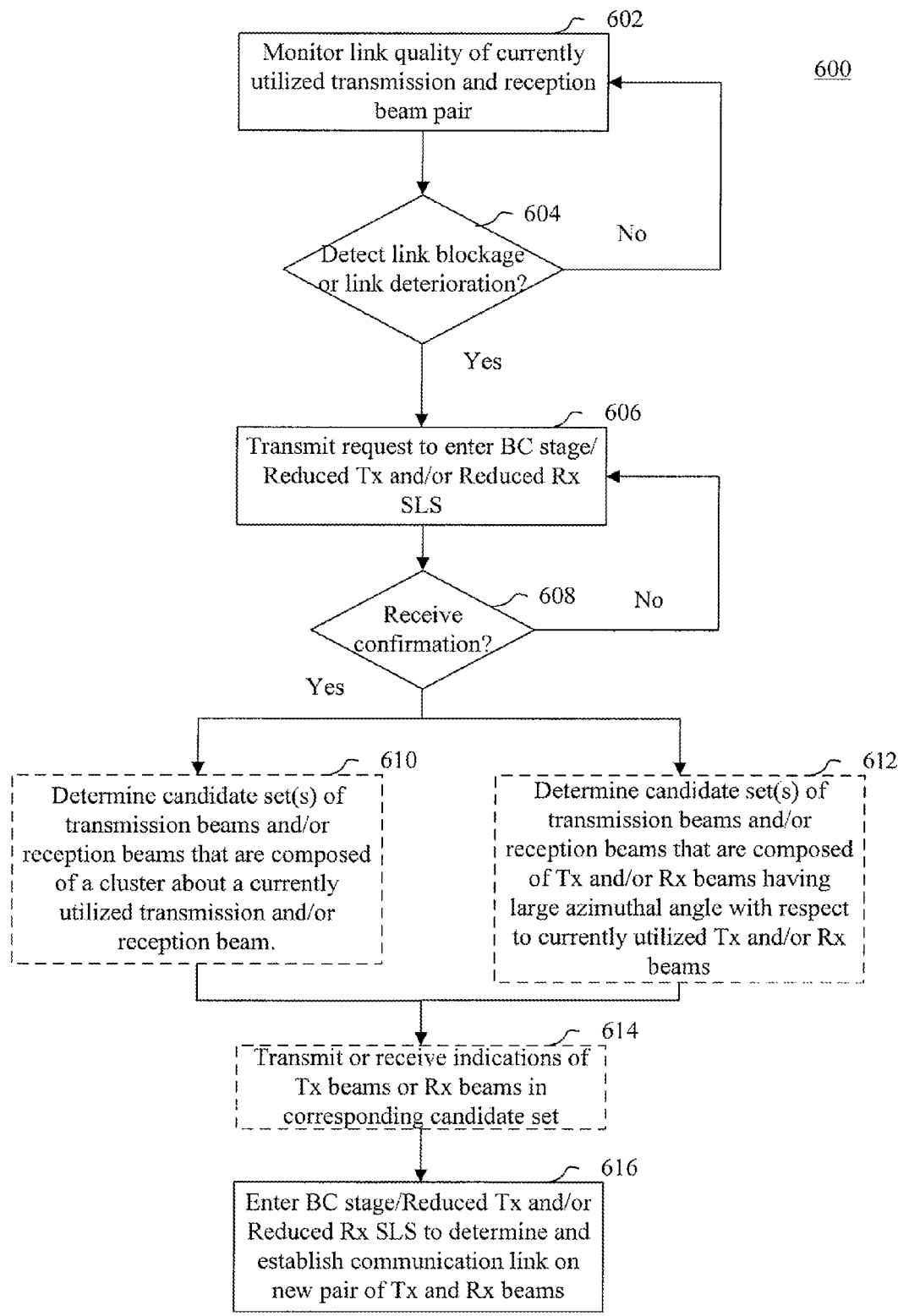
FIG. 6 is a block/flow diagram of a method for determining a suitable pair of transmission and reception beams for communication of data signals in response to a degradation of channel conditions.

With reference now to FIG. 6, with continuing reference to FIGS. 1-3, a method 600 for determining a transmission and reception beam pair for use in establishing a communication link in response to a link deterioration or link blockage event in accordance with an exemplary embodiment is illustrated. It should be understood that the method 600 can be implemented by either the controller 118 of the transmitter system 110 or the processor 158 of the receiver system 150. The method 600 can begin at step 602 in which the controller 118 or the processor 158 can monitor the link quality of a currently utilized transmission beam and reception beam pair.

At step 604, the controller 118 or the processor 158 can determine whether a link blockage or a link deterioration event has occurred. For example, at step 602, the controller 118 can monitor the rate of increase of packet loss based on a ratio of acknowledgment packets received to a number of packets sent. Thus, if the rate of increase of packet loss has surpassed a threshold rate of increase, then the controller 118 can determine that a link deterioration event has occurred. For example, if the packet loss rate is greater than 'a' % then the controller 118 can determine that a link deterioration event has occurred. Further, the controller 118 can also monitor the bit-rate and determine that if the bit rate drop is greater than 'x' bit-rate levels, where x>1, then the controller 118 can determine that a link blockage event has occurred. Alternatively or additionally, at step 602, the controller 118 can monitor the number of retries employed to transmit a packet without receiving an acknowledgement packet. Here, if the number of retries meets or surpasses a threshold number of retries, then the controller 118 can determine that a link blockage event has occurred.

Moreover, at step 602, the processor 158 can monitor the rate of deterioration of a signal quality. For example, if the rate of drop in SNR is greater than 'y' dB, then the processor 158 can interpret this drop as that due to link blockage. In addition, if the rate of drop in SNR is greater than 'b' dB, where b is less than y, then the processor 158 can interpret this drop as that due to small, slow channel changes as a result of link deterioration.

Alternatively or additionally, at step 602, the processor 158 can monitor a timeout period during which a data packet is not received. Thus, if the timeout period exceeds a timeout threshold, then the processor 158 can determine that a link blockage event has occurred.

It should be noted that the values of the threshold rate drops, the threshold number of retries and the timeout period can be chosen based on design choice. In addition, it should also be understood that other methods for detecting the deterioration of the quality of a communication link and/or for detecting a link blockage known in the art can be employed at steps 602 and 604.

If neither a link blockage nor a link deterioration event has been detected, then the method can proceed to step 602 and can be repeated. Otherwise, if a link blockage or a link deterioration event has been detected, then the method can proceed to step 606 in which the controller 118 or the processor 158 can direct the transmission of a request to enter a BC stage or a reduced Tx or Rx SLS procedure to the receiver 150 or the transmitter 110, respectively. The request can include an indication of why the system seeks to initiate the BC stage or the reduced Tx and/or Rx SLS stage. For example, the request can indicate that it has detected a link blockage or a link deterioration event. In the case of a link deterioration event, the request can be transmitted via a currently utilized pair of transmission or reception beams or the request can be transmitted along a channel dedicated for control information. In the case of a link blockage event, the request can be transmitted along a channel dedicated for control information. Alternatively, both the transmitter system 110 and the receiver system 150 can be configured to perform steps 602 and 604 and, in the case of a link blockage event, both systems can automatically proceed to step 612, described in more detail herein below.

At step 608, the controller 118 or the processor 158 can determine whether it has received a confirmation from the receiver device 150 or the transmitter device 110, respectively. If the controller 118 implements the method 600, then the confirmation, in the case of a BC stage request, can include one or more of: the number of reception beams to be used in the requested BC stage; the number of transmission beams to be used in the subsequent BC stage; and/or the actual set of transmission beams to be used during the requested BC stage. In turn, if the processor 158 implements the method 600, then the confirmation can include, in the case of a requested BC stage, one or more of: the number of reception beams to be used in the requested BC stage; the number of transmission beams to be used in the subsequent BC stage; and/or the actual set of reception beams to be used during the requested BC stage. Here, the receiver system 150 can indicate to the transmitter 110 the number of reception beams to be used during beam combination so that the transmitter system knows how many times transmissions should be repeated on the same transmission beam. Alternatively, the confirmation can simply include a confirmation to enter the BC stage without any information concerning the transmission and reception beams, as in certain exemplary embodiments, each device can respectively determine their own corresponding set of beams to trial during the beam combination stage.

The method can proceed to step 610 if a link deterioration event has been detected at step 604 or can proceed to step 612 if a link blockage event has been detected at step 604.

At optional step 610, the controller 118 or the processor 158 can obtain candidate set(s) of transmission beams and/or reception beams that are composed of a cluster about a transmission or reception beam utilized in the link monitored at step 602. For example, the candidate set of transmission beams can be clustered about the transmission beam on which the link is established while the candidate set of reception beams can be clustered about the reception beam on which the link is established. Furthermore, the DoDs of transmission beams recorded in accordance with method 200 or 300 can be employed to select the candidate set of transmission beams while the DoAs of reception beams recorded in accordance with method 200 or 300 can be employed to select the candidate set of reception beams. For example, the controller 118 or the processor 158 can review the recorded DoDs and can select, for inclusion in the candidate set of transmission beams, transmission beams having DoDs with azimuthal angles that are within a first threshold angle of the transmission beam on which the link is established. Similarly, the controller 118 or the processor 158 can review the recorded DoAs and can select, for inclusion in the candidate set of reception beams, reception beams having DoAs with azimuthal angles that are within a second threshold angle of the reception beam on which the link is established. It should be noted that the first and second threshold angles can be based on design choice and can be different or identical to each other.

Alternatively, at optional step 610, the controller 118 or the processor 158 can obtain the candidate sets from the various lists generated in accordance with method 200 and/or method 300. For example, the controller 118 or the processor 158 can obtain the first list for both the reception beams and the transmission beams discussed above with respect to the method 200 that is compiled based only on a signal quality threshold. Alternatively, the controller 118 and the processor 158 can obtain a list of transmission beams and a list reception beams respectively compiled in accordance with metric2 and metric4, as discussed above with respect to steps 208 and 226, as respective candidate sets. Furthermore, to ensure that the lists are better tailored to a link deterioration event, the candidate sets can be the top Q entries in the respective lists of transmission beams and reception beams in accordance with metric2 and metric4. Alternatively, the controller 118 or the processor 158 can obtain a list of transmission beam and reception beam pairs, or the top Q entries in the list, compiled in accordance with metric6 in method 200 or method 300.

At optional step 612, the controller 118 or the processor 158 can determine candidate set(s) of transmission beams and/or reception beams that are composed of transmission and/or reception beams having a large azimuthal angle with respect to a transmission and/or a reception beam utilized in the link monitored at step 602. For example, the candidate set of transmission beams can have a large azimuthal angle from the transmission beam on which the link is established while the candidate set of reception beams can have a large azimuthal angle from the reception beam on which the link is established. Similar to step 610, the DoDs of transmission beams recorded in accordance with method 200 or 300 can be employed to select the candidate set of transmission beams while the DoAs of reception beams recorded in accordance with method 200 or 300 can be employed to select the candidate set of reception beams. For example, the controller 118 or the processor 158 can review the recorded DoDs and can select, for inclusion in the candidate set of transmission beams, transmission beams having DoDs with azimuthal angles that exceed a first threshold angle from the transmission beam on which the link is established. Similarly, the controller 118 or the processor 158 can review the recorded DoAs and can select, for inclusion in the candidate set of reception beams, reception beams having DoAs with azimuthal angles that exceed a second threshold angle from the reception beam on which the link is established. It should be noted that the first and second threshold angles here can be based on design choice and can be different or identical to each other. Furthermore, the thresholds employed at step 612 are larger than the thresholds employed at step 610.

Alternatively, at optional step 610, the controller 118 or the processor 158 can obtain the candidate sets from the various lists generated in accordance with method 200 and/or method 300. For example, the controller 118 or the processor 158 can obtain the first list for both the reception beams and the transmission beams discussed above with respect to the method 200 that is compiled based only on a signal quality threshold. Alternatively, the controller 118 and the processor 158 can obtain a list of transmission beams and a list reception beams respectively compiled in accordance with metric1 and metric3, as discussed above with respect to steps 208 and 226, as respective candidate sets. Furthermore, to ensure that the lists are better tailored to a link blockage event, the candidate sets can be the top Q entries in the respective lists of transmission beams and reception beams in accordance with metric1 and metric3. Alternatively, the controller 118 or the processor 158 can obtain a list of transmission beam and reception beam pairs, or the top Q entries in the list, compiled in accordance with metric5 in method 200 or method 300. It should be noted that the threshold denoting a large azimuthal angle can be variable and can be dependent on the lowest entry in any of the lists compiled in accordance with metrics 1, 3 and 5. For example, the DoD threshold denoting a large azimuthal angle can correspond to the DoD of the last transmission beam in the set, or the subset of Q entries, of transmission beams included in the list ordered in accordance with metrics 1 and 5. Similarly, the DoA threshold denoting a large azimuthal angle can correspond to the DoA of the last reception beam in the set, or the subset of Q entries, of reception beams included in the list ordered in accordance with metrics 3 and 5.

At optional step 614, the controller 118 or the processor 158 can transmit or receive indications of the transmission beams and reception beams in the corresponding candidate sets obtained at step 610 or step 612. For example, if the controller 118 performs step 610 or step 612, then the controller 118 can transmit the indication of the candidate sets to the processor 150. Alternatively, if the controller 118 does not perform step 610 or step 612, then the controller 118 can receive the candidate sets from the processor 158. Alternatively, step 614 can be omitted if both the controller 118 and the processor 158 are configured to perform steps 610 and 612.

At step 616, the controller 118 and the processor 158 can respectively direct the transmitter system 110 and the receiver system 150 to enter into a BC stage or a reduced Tx and/or Rx SLS to determine and establish a communication link on a new pair of transmission and reception beams.

For example, the candidate sets obtained at step 610 or step 612 can be employed as the candidate sets of transmission and reception beams trialed in accordance with method 300 to determine a new set of transmission and reception beams on which to establish a communication link at steps 330 and 332. For example, as discussed above, the candidate sets can be trialed and the pair of transmission and reception beams resulting in the highest signal quality can be selected at steps 326 and 328 and employed to establish a communication link. Here, because the candidate sets are tailored to the specific communication link condition encountered, the systems can determine a pair of transmission and reception beams to utilize for the transmission of data in a substantially fast and effective manner.

Figure 7:
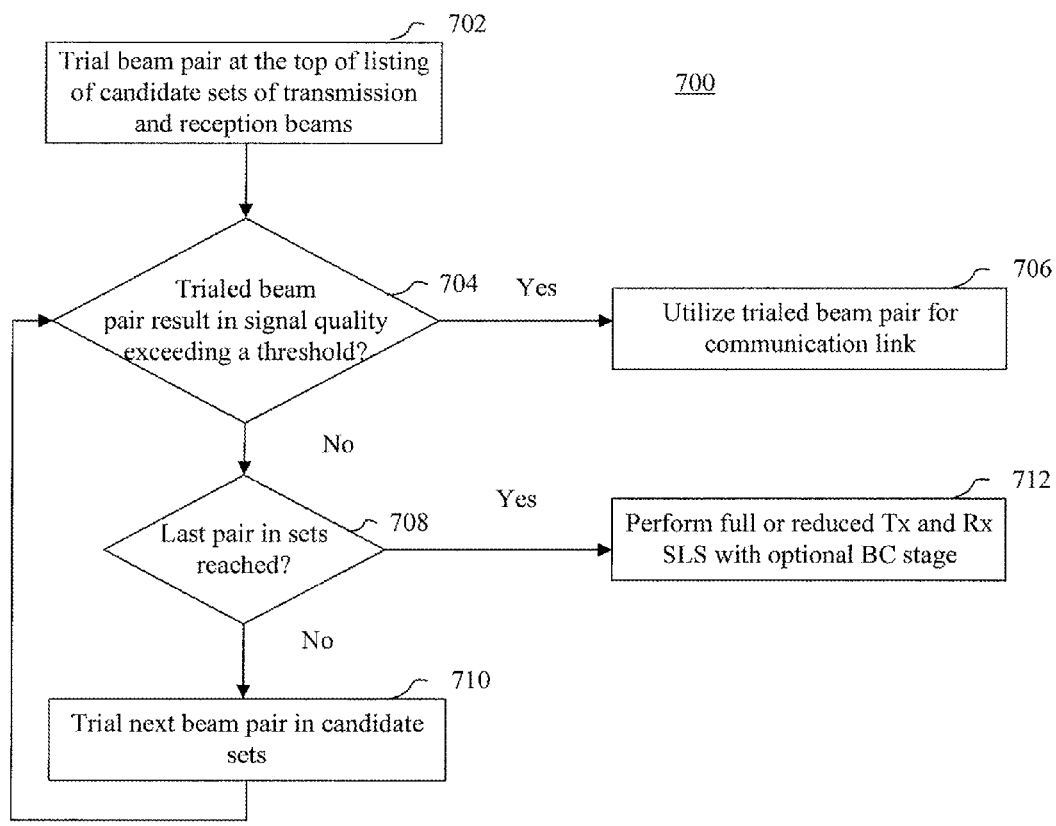
FIG. 7 is a block/flow diagram of an embodiment of an alternative beam combination procedure.

In accordance with another implementation, the BC stage can be simplified such that, as opposed to attempting every transmission beam and reception beam pair in the candidate sets, the transmitter system 110 and the receiver system can successively apply entries in the candidate sets. For example, with reference to FIG. 7, a simplified beam combination method 700 in accordance with one exemplary embodiment is illustrated. The method 700 can begin at step 702 in which the transmission system 110 and the reception system 150 can trial a beam pair at the top of the listings of candidate sets of transmission and reception beams obtained at step 610 or step 612 to obtain a signal quality measure for the pair. For example, in the case of a link blockage event, the transmitter 110 and the receiver 150 can apply the pair of beams corresponding to the first entries of the listing, or a subset of the listing, of transmission beams ordered in accordance with metric1 and the listing, or a subset of the listing, of reception beams ordered in accordance with metric3. Alternatively, in the case of a link deterioration event, the transmitter 110 and the receiver 150 can apply the pair of beams corresponding to the first entries of the listing, or a subset of the listing, of transmission beams ordered in accordance with metric2 and the listing, or a subset of the listing, of reception beams ordered in accordance with metric4. Similarly, the first entries of the listing prioritized in accordance with metric5 and metric6 can be trialed in the case of a link blockage and a link deterioration event, respectively. Alternatively, as noted above, the listing based solely on the signal quality, or a subset of the listing, can be employed. Here, the first entries of the transmission beam listing and the reception beam listing ordered in accordance with signal quality can be trialed.

It should be noted that any reference to a listing with respect to methods 600 and 700 that is compiled or prioritized in accordance with a metric can exclude the entries corresponding to beam pairs on which a link deterioration or a link blockage has been detected at step 604, as trial of beams in such entries would not lead to finding a suitable reception beam and transmission beam pair on which to transmit data.

At step 704, the processor 158 or the controller 118 can determine whether the signal quality measure exceeds a signal quality threshold. The signal quality threshold may be selected in accordance with design choice. If the signal quality measure exceeds the signal quality threshold, then the method can proceed to step 706, in which the trialed beam pair can be utilized to establish a communication link for the transmission of data. Otherwise, the method can proceed to step 708 in which the processor 158 or the controller 118 can determine whether the last pair in the candidate sets have been reached. If the last pair has been reached, then the method can proceed to step 712 in which the transmitter system 110 and the receiver system 150 can perform a full or reduced transmitter and receiver SLS in accordance with the method 200 and can optionally perform a beam combination procedure in accordance with the method 300. Otherwise, the method can proceed to step 710 in which the next beam pair in the candidate sets can be trialed. Thereafter, the method can be repeated until a sufficient beam pair has been found or until the end of the candidate sets have been reached.

Similarly, at step 616, the candidate sets of transmission and reception beams can be employed in a reduced Tx and/or a reduced Rx SLS in accordance with method 200. Here, the transmitter system 110, during the transmitter SLS performed at step 202, can use either full set of transmission beams or small set of transmission beams corresponding to any one of the transmission beam candidate sets that can be obtained at steps 610 and 612. In particular, the transmission beams can be a small set of transmission beams determined in accordance with signal quality or determined in accordance with both signal quality and DoD, as discussed above. For example, in the case of a link blockage event, the small set of transmission beams trialed can correspond to the listing, or the top Q entries of the listing, compiled in accordance with metric1 or metric5. In turn, in the case of a link deterioration event, the small set of transmission beams trialed can correspond to the listing, or the top Q entries of the listing, compiled in accordance with metric3 or metric6.

Furthermore, for a reduced receiver SLS, the receiver system 150 can use either full set of beams or small set of reception beams corresponding to any one of the candidate sets that can be obtained at steps 610 and 612 during the receiver SLS performed at step 202. In particular, the reception beams can be a small set of reception beams determined in accordance with signal quality or determined in accordance with both signal quality and DoA, as discussed above.

For example, in the case of a link blockage event, the small set of reception beams trialed can correspond to the listing, or the top Q entries of the listing, compiled in accordance with metric2 or metric5. In turn, in the case of a link deterioration event, the small set of reception beams trialed can correspond to the listing, or the top Q entries of the listing, compiled in accordance with metric4 or metric6. It should be noted that, with respect to a reduced transmitter SLS and/or a reduced receiver SLS, the method 200 can otherwise be performed in the same manner discussed in detail above. Accordingly, by using a reduced set of transmission beams and reception beams based on past performance measures, the time taken in the SLS phases to determine appropriate candidate sets or to determine a new pair of transmission and receptions beams for the implementation of a communication link can be substantially reduced.

Figure 8:
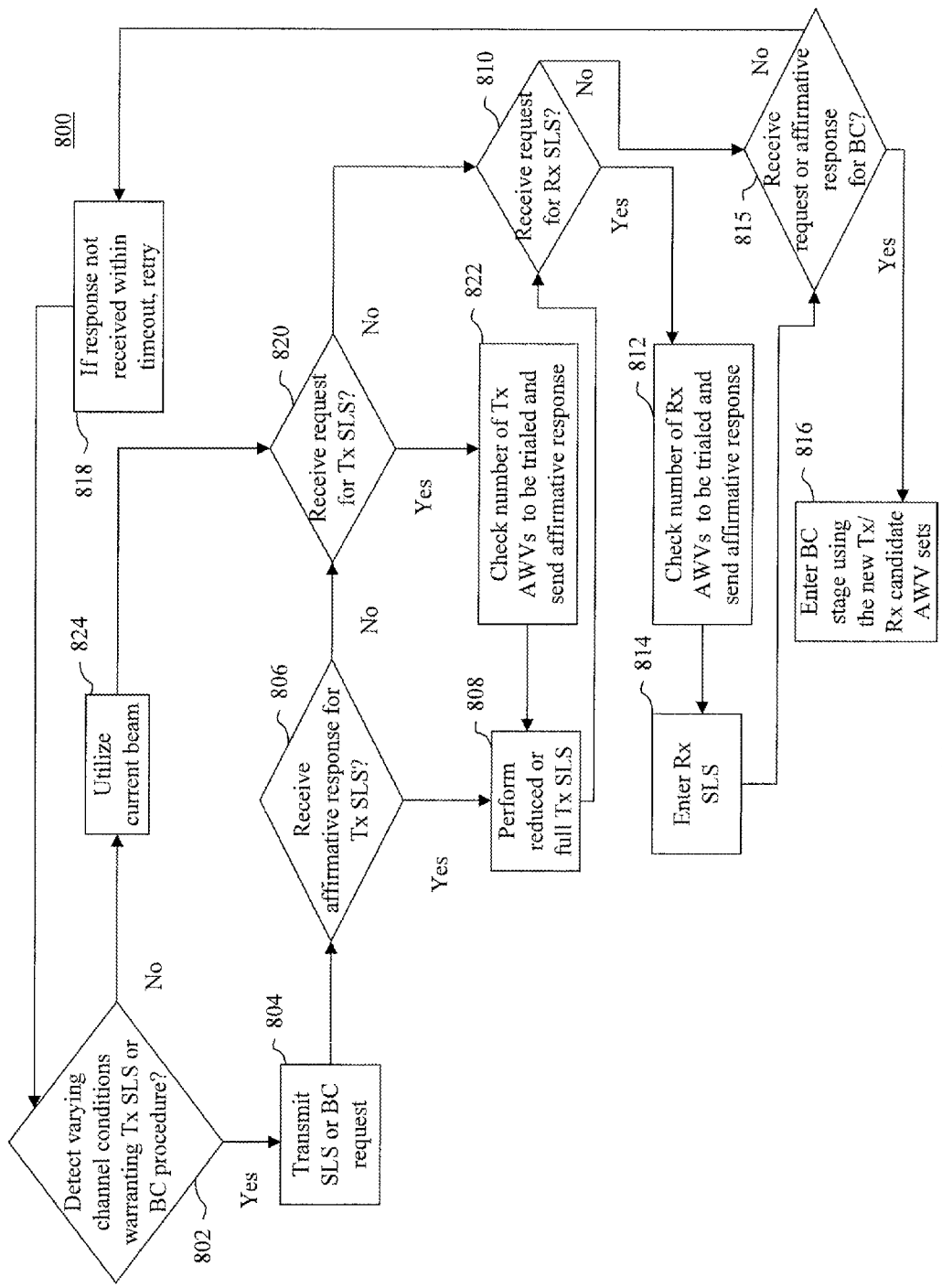
FIG. 8 is a block/flow diagram of an embodiment of a transmitter-implemented method for determining a suitable pair of transmission and reception beams for communication of data signals in response to a degradation of channel conditions.

With reference now to FIG. 8, a more specific implementation 800 for a method for selecting beam pairs for the transmission of data signals thereon in response to detecting a link blockage or link deterioration event that can be performed by the transmitter system 110 in accordance with an exemplary embodiment is illustrated. The method 800 can begin at step 802 in which the transmitter system 110 can detect whether varying channel conditions warranting a Tx SLS or BC procedure exist. For example, the transmitter system 110 can detect whether a link blockage or a link deterioration event has occurred, as described above.

If the transmitter system 110 detects the existence of channel conditions warranting a Tx SLS or BC procedure, then the method can proceed to step 804, in which the transmitter 110 can transmit a request for the implementation of a full or for a reduced Tx SLS or a direct BC procedure. For example, the full or reduced Tx SLS procedure can be performed in accordance with method 200, while the BC procedure can be performed in accordance with method 300 or method 700, as discussed above. For example, the transmitter 110 can transmit the request to the receiver system 150 in a packet with an "SLS request" bit set in the header along with bits indicating the number of transmission AWVs to be trialed. Similarly, the transmitter system 110 can send a packet with a "BC request" bit set in the header to indicate a request for a BC procedure. Furthermore, the transmitter 110 can also include a bit indicating why the transmitter system 110 is transmitting the request. For example, the transmitter system 110 can indicate whether the request is made due to a link blockage or a link deterioration event to permit the receiver system 150 to determine the appropriate set of reception beams to be applied, as discussed above.

At step 806, the transmitter system 110 can determine whether it has received an affirmative response for Tx SLS from the receiver 150. If so, then the method can proceed to step 808 in which the transmitter 110 can perform a reduced or full Tx SLS with the receiver system 150. For example, at step 808, the transmitter 110 can collect, from the receiver system 150, all signal qualities, as described above with regard to method 200. Further, the transmitter system 110 can also employ DoDs and signal qualities to select the best Tx AWVs, as described above with respect to method 200. If the DoDs were sent with each Tx AWV trialed, then the transmitter system 110 can directly receive the identifiers of the best Tx AWVs from the receiver system 150, which can determine them as discussed above with regard to the method 200.

The method can then proceed to step 810, in which the transmitter system 110 can determine whether it has received a request for a full or reduced Rx SLS from the receiver system 150. If not, then the method can proceed to step 815, discussed in more detail herein below. If the transmitter system 110 has received a request for a full or reduced RX SLS, then the method can proceed to step 812 in which the transmitter system 110 can check the number of Rx AWVs to be trialed. The number of Rx AWVs to be trialed can be predetermined or pre-stored at the transmitter system 110 or can be included with the request for Rx SLS. In addition, at step 810, the transmitter system 110 can transmit an affirmative response to the receiver system 150. Thereafter, the method can proceed to step 814, in which the transmitter system 110 can enter into Rx SLS, as described above, for example, with respect to method 200.

The method may thereafter proceed to step 815, in which the transmitter 110 can determine whether it has received a request for or an affirmative response to a request for a BC procedure. Here, the transmitter system 110 can check whether the "BC request/response" bit is set in the header of a request/response packet received from the receiver system 150. The transmitter 110 can also check whether information on the number of reception beams to be used by the receiver system 150 or the number of transmission beams to be used by the transmitter 110 in the subsequent BC stage is present. Optionally, the transmitter 110 can also optionally check whether information indicating transmission beam identifiers to be used by the transmitter system 110 in the subsequent BC procedure is present. If the request/response has been received, then the method can proceed to step 816 in which the transmitter system 110 and the receiver system 150 can enter into the BC stage, as described above, for example, with respect to method 300 or method 700, using previously determined candidate sets of transmission beams and reception beams. If, at step 815, the transmitter 110 determines that it did not receive a request for or an affirmative response to a request for a BC procedure, then the method can proceed to step 818, in which the transmitter 110 can institute a retry of any request for a Tx SLS or a BC stage transmitted to the receiver system 150 if a response to the request has not been received within a timeout period. Thereafter, the method can proceed to step 802 and can be repeated.

Returning to step 806, if the transmitter system 110 has not received an affirmative response for the Tx SLS, then the method can proceed to step 820, in which the transmitter system 110 can determine whether it has received a request for full or reduced Tx SLS from the receiver system 150. If not, then the method can proceed to step 810, in which the transmitter system can determine whether it has received a request for a full or reduced Rx SLS, as discussed above. Otherwise, the method can proceed to step 822, in which the transmitter system 110 can check the number of transmission AWVs to be trialed and can send an affirmative response to the receiver system 150. Thereafter, the method can proceed to step 808, which can be implemented as discussed above. Further, it should be noted that if the transmitter 110 determines at step 802 that channel conditions do not warrant a full or reduced transmitter SLS or a BC procedure, then the method can proceed to step 824 in which the transmitter system 110 maintains the communication link with the receiver system 150 on a currently utilized transmission beam. Thereafter, the method can proceed to step 820 and can be implemented as discussed above.

Figure 9:
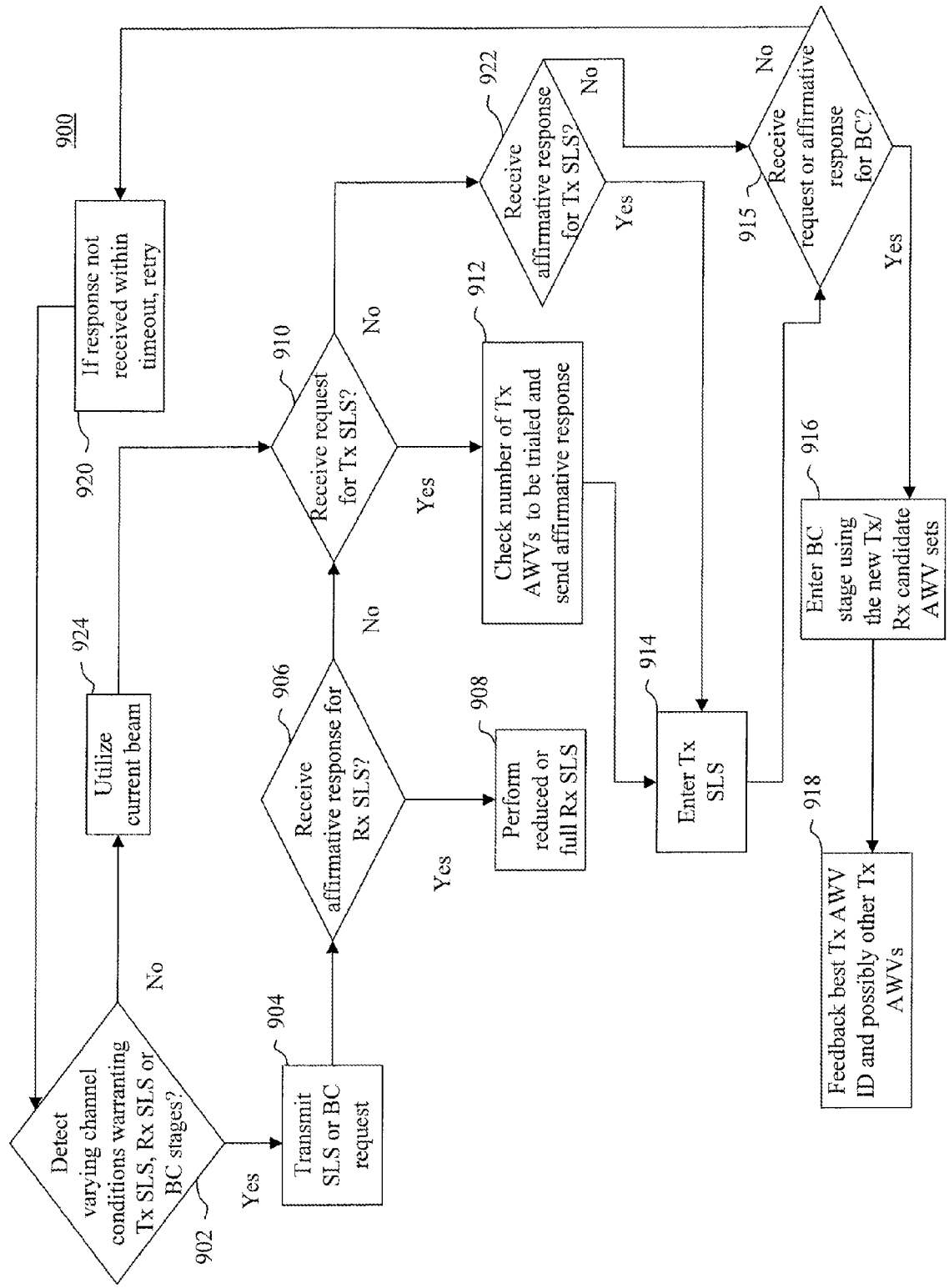
FIG. 9 is a block/flow diagram of an embodiment of a receiver-implemented method for determining a suitable pair of transmission and reception beams for communication of data signals in response to a degradation of channel conditions.

With reference now to FIG. 9, a more specific implementation 900 for a method for selecting beam pairs for the reception of data signals thereon in response to detecting a link blockage or link deterioration event that can be performed by the receiver system 150 in accordance with an exemplary embodiment is illustrated. It should be noted that the method 900 can complement method 800 and can be performed simultaneously with method 800.

The method 900 can begin at step 902 in which the transmitter system 110 can detect whether varying channel conditions warranting a Tx SLS, a Rx SLS and/or a BC procedure exist. For example, the transmitter system 110 can detect whether a link blockage or a link deterioration event has occurred, as described above. If the receiver system 150 detects the existence of channel conditions warranting a Tx SLS, a Rx SLS or BC procedure, then the method can proceed to step 904, in which the receiver 150 can transmit a request for the implementation of a full or a reduced Tx SLS, a full or reduced Rx SLS and/or a direct BC procedure. The request can be configured in the same manner described above with respect to step 804. For example, the receiver system 150 can indicate whether the request is made due to a link blockage or a link deterioration event to permit the transmitter system 110 to determine the appropriate set of transmission beams to be applied, as discussed above. Furthermore, the request can also include additional information. For example, the request can include information indicating the number of reception beams to be used by the receiver system 150 or the number of transmission beams to be used by the transmitter 110 in the subsequent BC stage, a reduced Rx SLS stage and/or a reduced Tx stage. Optionally, the request can include information indicating transmission beam identifiers to be used by the transmitter system 110 in a subsequent BC procedure or a reduced Tx and/or Rx SLS stage.

Thereafter, the method can proceed to step 906, in which the receiver system 150 can determine whether it has received an affirmative response for Rx SLS from the transmitter 110. If so, then the method can proceed to step 908 in which the receiver 150 can perform a reduced or full Rx. SLS with the transmitter system 110. For example, at step 908, the receiver system 150 can measure signal qualities, as described above with regard to method 200. Further, the receiver system 150 can also employ DoAs and signal qualities to select the best or candidate set of Rx AWVs, as described above with respect to method 200.

If at step 906, the receiver system 150 determines that it has not received an affirmative response for Rx SLS from the transmitter 110, then the method can proceed to step 910, in which the receiver system 150 can determine whether it has received a request for a full or reduced transmitter SLS. If so, the method can proceed to step 912, in which the receiver system 150 can check the number of Tx AWVs to be trialed and can transmit an affirmative response to the transmitter system 110. Thereafter, the method can proceed to step 914 in which the receiver system 150 and the transmitter system 100 can enter into a full or reduced Tx SLS procedure, as described above with respect to method 200. For example, the receiver system 150 can feedback signal qualities measured for all Tx AWVs whose corresponding packets could be decoded by the receiver 150. Further, if the DoDs were transmitted by the transmitter 110, the receiver system 150 can determine the identifiers of the candidate set of transmission beams based on the signal qualities and the DoDs, as discussed above with regard to step 208 of the method 200.

Thereafter, the method can proceed to step 915 in which the receiver 150 can determine whether it has received a request for or an affirmative response to a request for a BC procedure. If the request/response has been received, then the method can proceed to step 916 in which the transmitter 110 and the receiver system 150 can enter into the BC stage, as described above, for example, with respect to methods 300 or 700. If the received packet is a "BC response," the receiver system 150 can send an affirmative response including information on the number of reception beams to be used by the receiver system 150 and/or the number of transmission beams to be used by the transmitter 110 in the subsequent BC stage and/or information indicating transmission beam identifiers to be used by the transmitter system 110 in the subsequent BC procedure. The transmission beams and the reception beams can be obtained from previously determined candidate sets. In addition, subsequent to step 916, at step 918, the receiver system 150 can feedback the identifiers for the best or optimal transmission beam in addition to an optional new candidate set of transmission beams and/or an indication of a subset of the top Q transmission beams in the candidate set, as discussed above. The optimal transmission beam and reception beam pair determined from the BC stage performed at step 916 can be employed to establish a new communication link between the receiver system 150 and the transmitter system 110.

If at step 915, the transmitter 110 determines that it did not receive a request for or an affirmative response to a request for a BC procedure, then the method can proceed to step 920, in which the transmitter 110 can institute a retry of any request for a Rx SLS, a Tx SLS and/or a BC stage transmitted to the transmitter system 110 if a response to the request has not been received within a timeout period. Thereafter, the method can proceed to step 902 and can be repeated.

Returning to step 910, if the receiver system 150 determines that it has not received a request for a full or reduced Tx SLS, then the method can proceed to step 922, in which the receiver 150 can determine whether it has received a positive response for Tx SLS. If so, then the method can proceed to step 914, which can be implemented as discussed above.

Further, it should be noted that if the receiver 150 determines at step 902 that channel conditions do not warrant a full or reduced receiver SLS, a full or reduced transmitter SLS and/or a BC procedure, then the method can proceed to step 924 in which the receiver system 150 maintains the communication link with the transmitter system 110 on a currently utilized transmission beam. Thereafter, the method can proceed to step 910 and can be implemented as discussed above.

The exemplary embodiments described above provide mechanisms to quickly search for and identify a pair of beams by trailing transmission and reception beams that have been chosen dynamically and intelligently with respect to different channel conditions encountered. Furthermore, the use of a joint beam trial mechanism for addressing channel condition changes and the tailored selection of beams to explicitly handle different conditions enables a timely rectification of a deteriorated or blocked communication link.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method implemented in a wireless communications system, the method comprising:
    transmitting, from a wireless transmitter having a transmit antenna array, a first signal on each of a plurality of different transmit beams in transmitter (TX) sector level sweep (SLS);

receiving, at a wireless receiver having a receive antenna array, the first signal;
determining, at the wireless receiver, quality of the first signal;
transmitting, from the wireless transmitter, a second signal to allow the wireless receiver to sweep a plurality of receive beams;
receiving, at the wireless receiver, the second signal on each of the plurality of receive beams;
determining, at the wireless receiver, quality of the second signal;
transmitting, from the wireless transmitter, an indication of direction of departure (DoD) for each of the plurality of different transmit beams; and
receiving, at the wireless receiver, the indication of DoD,
wherein the indication of DoD comprises an identifier (ID) of said each of the plurality of different transmit beams,
wherein the first signal is received at the wireless receiver on an omni-directional receive beam or a quasi-omni directional receive beam, and
wherein the second signal is transmitted from the wireless transmitter on an omni-directional transmit beam or a quasi-omni directional transmit beam.

2. The method as in claim 1, further comprising:
transmitting, from the wireless receiver, an indication of a candidate transmit beam; and
receiving, at the wireless transmitter, the indication of the candidate transmit beam.

3. The method as in claim 1, further comprising:
determining, at the wireless receiver, a candidate receive beam.

4. The method as in claim 1,
wherein the TX SLS is initiated by the wireless transmitter.

5. The method as in claim 1,
wherein the TX SLS is carried out through applying a first antenna array weight vector (AWV) to the transmit antenna array.

6. The method as in claim 1,
wherein the receive sectors are swept through applying a second antenna array weight vector (AWV) to the receive antenna array.

7. A method implemented in a wireless transmitter having a transmit antenna array, the method comprising:
transmitting a first signal on each of a plurality of different transmit beams in transmitter (TX) sector level sweep (SLS);
transmitting a second signal to allow a wireless receiver having a receive antenna array to sweep a plurality of receive beams; and
transmitting an indication of direction of departure (DoD) for each of the plurality of different transmit beams,
wherein the wireless receiver receives the first signal and determines quality of the first signal,
wherein the wireless receiver receives the second signal on each of the plurality of receive beams and determines quality of the second signal,
wherein the wireless receiver receives the indication of DoD,
wherein the indication of DoD comprises an identifier (ID) of said each of the plurality of different transmit beams,
wherein the first signal is received at the wireless receiver on an omni-directional receive beam or a quasi-omni directional receive beam, and
wherein the second signal is transmitted from the wireless transmitter on an omni-directional transmit beam or a quasi-omni directional transmit beam.

8. A method implemented in a wireless receiver having a receive antenna array, the method comprising:
receiving a first signal;
determining quality of the first signal;
receiving a second signal on each of a plurality of receive beams;
determining quality of the second signal; and
receiving an indication of direction of departure (DoD),
wherein a wireless transmitter having a transmit antenna array transmits the first signal on each of a plurality of different transmit beams in transmitter (TX) sector level sweep (SLS),
wherein the wireless transmitter transmits the second signal to allow the wireless receiver to sweep the plurality of receive beams,
wherein the wireless transmitter transmits the indication of DoD for each of the plurality of different transmit beams,
wherein the indication of DoD comprises an identifier (ID) of said each of the plurality of different transmit beams,
wherein the first signal is received at the wireless receiver on an omni-directional receive beam or a quasi-omni directional receive beam, and
wherein the second signal is transmitted from the wireless transmitter on an omni-directional transmit beam or a quasi-omni directional transmit beam.

9. A wireless communications system comprising:
a wireless transmitter having a transmit antenna array to transmit a first signal on each of a plurality of different transmit beams in transmitter (TX) sector level sweep (SLS); and
a wireless receiver having a receive antenna array to receive the first signal and
determine quality of the first signal;
wherein the wireless transmitter transmits a second signal to allow the wireless receiver to sweep a plurality of receive beams,
wherein the wireless receiver receives the second signal on each of the plurality of receive beams and determines quality of the second signal,
wherein the wireless transmitter transmits an indication of direction of departure (DoD) for each of the plurality of different transmit beams,
wherein the wireless receiver receives the indication of DoD,
wherein the indication of DoD comprises an identifier (ID) of said each of the plurality of different transmit beams,
wherein the first signal is received at the wireless receiver on an omni-directional receive beam or a quasi-omni directional receive beam, and
wherein the second signal is transmitted from the wireless transmitter on an omni-directional transmit beam or a quasi-omni directional transmit beam.

10. A transmitter circuit for a wireless transmitter having a transmit antenna array, the transmitter circuit comprising:
a transmitting unit to transmit
a first signal on each of a plurality of different transmit beams in transmitter (TX) sector level sweep (SLS),
a second signal to allow a wireless receiver having a receive antenna array to sweep a plurality of receive beams, and
an indication of direction of departure (DoD) for each of the plurality of different transmit beams,
wherein the wireless receiver receives the first signal and determines quality of the first signal;

wherein the wireless receiver receives the second signal on each of the plurality of receive beams and determines quality of the second signal, wherein the wireless receiver receives the indication of DoD, wherein the indication of DoD comprises an identifier (ID) of said each of the plurality of different transmit beams, wherein the first signal is received at the wireless receiver on an omni-directional receive beam or a quasi-omni directional receive beam, and wherein the second signal is transmitted from the wireless transmitter on an omni-directional transmit beam or a quasi-omni directional transmit beam.

11. A receiver circuit for a wireless receiver having a receive antenna array, the receiver circuit comprising:
- a receiving unit to receive
  - a first signal,
  - a second signal on each of a plurality of receive beams, and
  - an indication of direction of departure (DoD); and
- a determination unit to determine quality of the first signal and quality of the second signal, wherein a wireless transmitter having a transmit antenna array transmits the first signal on each of a plurality of different transmit beams in transmitter (TX) sector level sweep (SLS), wherein the wireless transmitter transmits the second signal to allow the wireless receiver to sweep the plurality of receive beams, wherein the wireless transmitter transmits the indication of DoD for each of the plurality of different transmit beams, wherein the indication of DoD comprises an identifier (ID) of said each of the plurality of different transmit beams, wherein the first signal is received at the wireless receiver on an omni-directional receive beam or a quasi-omni directional receive beam, and wherein the second signal is transmitted from the wireless transmitter on an omni-directional transmit beam or a quasi-omni directional transmit beam.

* * * * *